(12) United States Patent
Koike

(10) Patent No.: US 8,818,540 B2
(45) Date of Patent: Aug. 26, 2014

(54) SOUND PROCESSING APPARATUS

(75) Inventor: Yuji Koike, Yokohama (JP)

(73) Assignee: Yamaha Corporation (JP)

( * ) Notice: Subject to any disclaimer, the term of this patent is extended or adjusted under 35 U.S.C. 154(b) by 653 days.

(21) Appl. No.: 12/947,711

(22) Filed: Nov. 16, 2010

(65) Prior Publication Data

US 2011/0118861 A1    May 19, 2011

(30) Foreign Application Priority Data

Nov. 16, 2009  (JP) ................................. 2009-260788
Feb. 26, 2010  (JP) ................................. 2010-041524

(51) Int. Cl.
*G06F 17/00*   (2006.01)
*G10H 1/00*    (2006.01)
*G10L 21/00*   (2013.01)
*H04L 29/06*   (2006.01)

(52) U.S. Cl.
CPC .......... *G10L 21/00* (2013.01); *G10H 2240/305* (2013.01); *H04L 65/605* (2013.01); *G10H 1/0058* (2013.01); *G10H 2210/331* (2013.01)
USPC .......................................................... 700/94

(58) Field of Classification Search
USPC ..................... 700/94; 704/500–504; 381/119; 369/1–12
See application file for complete search history.

(56) References Cited

U.S. PATENT DOCUMENTS

| | | | |
|---|---|---|---|
| 5,892,171 A | 4/1999 | Ide | |
| 7,223,912 B2 | 5/2007 | Nishimoto et al. | |
| 7,268,287 B2 | 9/2007 | Kawashima | |
| 2003/0055518 A1 | 3/2003 | Aiso et al. | |
| 2005/0192688 A1* | 9/2005 | Takemura | 700/94 |
| 2007/0028750 A1 | 2/2007 | Darcie et al. | |

FOREIGN PATENT DOCUMENTS

| | | |
|---|---|---|
| EP | 1569371 A2 | 8/2005 |
| EP | 1939856 A2 | 7/2008 |
| JP | 10-177380 A | 6/1998 |
| JP | 11-085148 A | 3/1999 |
| JP | 2001-042865 A | 2/2001 |

(Continued)

OTHER PUBLICATIONS

Partial European Search Report for corresponding EP 10191328.3, dated Oct. 16, 2013.

(Continued)

*Primary Examiner* — Andrew C Flanders
(74) *Attorney, Agent, or Firm* — Rossi, Kimms & McDowell LLP

(57) ABSTRACT

A sound processing apparatus that communicates with a terminal apparatus through a communication network, includes: a main storage device; an auxiliary storage device that stores a management program and a sound processing program; a management element being implemented by making the management program resident in the main storage device, the management element that receives audio data transmitted from the terminal apparatus by a streaming method and that stores the received audio data in the main storage device, the management element that acquires, from the main storage device, processed data generated by performing sound processing on the audio data and that transmits the processed data to the terminal apparatus by a streaming method; and a sound processing element being implemented by making the sound processing program resident in the main storage device, the sound processing element that performs the sound processing on the audio data to generate the processed data when the management element stores the audio data in the main storage device and that stores the generated processed data in the main storage device.

6 Claims, 23 Drawing Sheets

(56) References Cited

FOREIGN PATENT DOCUMENTS

| | | |
|---|---|---|
| JP | 2002-023649 A | 1/2002 |
| JP | 2002-236490 A | 8/2002 |
| JP | 2004-094163 A | 3/2004 |
| JP | 2005-055672 A | 3/2005 |

OTHER PUBLICATIONS

European Search Report issued in European counterpart application No. EP10191328.3, dated Apr. 1, 2014.

Japanese Office Action cited in Japanese counterpart application No. JP2010-041524, dated Dec. 26, 2013 English translation provided.

* cited by examiner

SOUND PROCESSING APPARATUS

BACKGROUND OF THE INVENTION

The present invention relates to a technique that performs sound processing on data received from a terminal apparatus and returns the processed data to the terminal apparatus through a communication network.

There is a technique which allows a sound processing apparatus (server apparatus) communicating with a terminal apparatus to perform various kinds of sound processing as a proxy (for example, Patent Document 1 or Patent Document 2). The sound processing apparatus performs sound processing on a waveform file received from the terminal apparatus and transmits the processed file to the terminal apparatus. According to the above-mentioned technique, the terminal apparatus can use the file generated by sound processing (for example, reproduce a sound subjected to the sound processing) without installing hardware or software required for sound processing in the terminal apparatus.

[Patent Document 1] JP-A-10-177380
[Patent Document 2] JP-A-11-085148

However, when a system that allows the sound processing apparatus to perform sound processing as a proxy is constructed in practice, various problems that are not mentioned in Patent Document 1 or Patent Document 2 are likely to arise. For example, in the technique disclosed in Patent Document 1 or Patent Document 2, one entire file to be subjected to sound processing is received from the terminal apparatus and then the sound processing apparatus starts sound processing. It takes a long time until the terminal apparatus can actually use the file subjected to sound processing after the user instructs the terminal apparatus to start the process.

SUMMARY

It is therefore an object of the invention to solve the above-mentioned problems when the sound processing apparatus performs sound processing as a proxy.

In order to achieve the object, according to a first aspect of the invention, there is provided a sound processing apparatus that communicates with a terminal apparatus through a communication network, the sound processing apparatus comprising: a main storage device; an auxiliary storage device that stores a management program and a sound processing program; a management element being implemented by making the management program resident in the main storage device, the management element that receives audio data transmitted from the terminal apparatus by a streaming method and that stores the received audio data in the main storage device, the management element that acquires, from the main storage device, processed data generated by performing sound processing on the audio data and that transmits the processed data to the terminal apparatus by a streaming method; and a sound processing element being implemented by making the sound processing program resident in the main storage device, the sound processing element that performs the sound processing on the audio data to generate the processed data when the management element stores the audio data in the main storage device and that stores the generated processed data in the main storage device.

In the above-mentioned aspect, audio data are transmitted to the sound processing apparatus by the streaming method, sound processing is performed on the audio data, and the processed data subjected to the sound processing are transmitted to the terminal apparatus by the streaming method and are then reproduced. Therefore, it is possible to reduce the time from the transmission of the audio data from the terminal apparatus to the actual listening of a reproduced sound subjected to the sound processing by the user, as compared to the structure in which the sound processing apparatus receives the entire file and then starts sound processing or the structure in which the terminal apparatus receives the entire file subjected to sound processing and then reproduces the received file. In addition, it is possible to make the management program for implementing the management element or the sound processing program for implementing the sound processing element resident in the main storage device, thereby storing the audio data or the processed data in the main storage device. Therefore, it is possible to effectively prevent a process delay, as compared to the structure in which the audio data or the processed data are stored in the auxiliary storage device.

The audio data may include first audio data and second audio data, the management element may store, in the main storage device, the audio data which includes the first audio data and the second audio data, and the sound processing element may perform the sound processing on the first audio data stored in the main storage device, using the second audio data stored in the main storage device.

In the above-mentioned aspect, in regards to the sound processing of one audio data, another audio data is reflected thereto. Therefore, for example, when the previous audio data and next audio data are affected by the sound processing of each audio data, it is possible to prevent the characteristics of the sound subjected to sound processing from being discontinuously changed at the boundary between the processed data.

The audio data may include third audio data, the management element may receive the third audio data before receiving the first audio data and the second audio data from the terminal apparatus, and store the third audio data in the main storage device. In case that the third audio data is stored in the main storage device when the management element receives the first audio data and the second audio data from the terminal apparatus, the management element may erase the third audio data from the main storage device.

In the above-mentioned aspect, audio data other than a predetermined number of audio data are sequentially erased from the main storage device. Therefore, it is possible to reduce the capacity required for the main storage device, as compared to the structure in which all of the previous audio data are stored in the main storage device.

The audio data may include process target data to be subjected to the sound processing and variable setting data indicating a set value which is designated by the terminal apparatus for a process variable of the sound processing, and the sound processing element may perform the sound processing which corresponds to the set value indicated by the variable setting data on the process target data.

In the above-mentioned aspect, the terminal apparatus can change the process variable of the sound processing performed on audio data.

The variable setting data may include timing data designating a time when a value of the process variable is changed to the set value, and the sound processing element may change the value of the process variable to the set value at the time designated by the timing data.

In the above-mentioned aspect, since the timing data for designating the time when the process variable is changed are included in the variable setting data, it is possible to change the process variable at any time of the process target data.

The management element may include an allocation element that performs an allocation processing to allocate the sound processing apparatus to the terminal apparatus.

The allocation element may perform the allocation processing with reference to allocation information, and the allocation information may include an identifier, a startup state and a load state of the sound processing apparatus.

According to an aspect of the invention, there is also provided a terminal apparatus comprising: an indicator configured to select a proxy mode in which a sound processing apparatus executes a sound processing program to perform sound processing and a self-processing mode in which the terminal apparatus executes a sound processing program to perform sound processing.

The sound processing program may be acquired from a server.

The sound processing program executed by the sound processing apparatus may be identical with the sound processing program executed by the terminal apparatus.

The sound processing program executed by the sound processing apparatus may be different from the sound processing program executed by the terminal apparatus.

DETAILED DESCRIPTION OF EMBODIMENTS

A: First Embodiment

A-1: Structure

Figure 1:
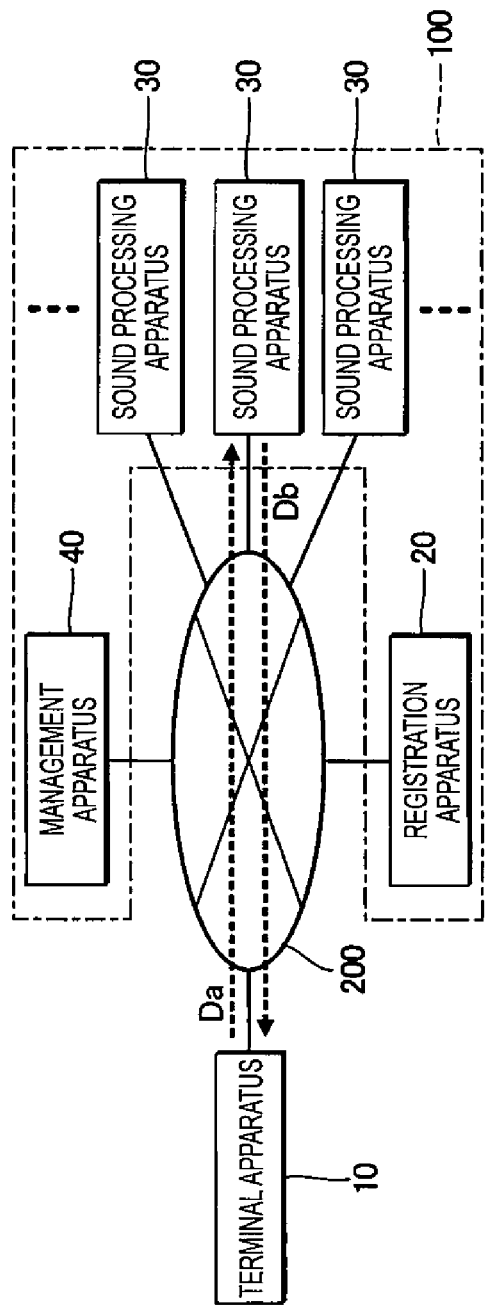
FIG. 1 is a block diagram illustrating a sound processing system according to a first embodiment.

FIG. 1 is a block diagram illustrating a sound processing system 100 according to a first embodiment of the invention. As shown in FIG. 1, the sound processing system 100 is a computer network system including a registration apparatus 20, a plurality of sound processing apparatuses 30, and a management apparatus 40. All components (the registration apparatus 20, each sound processing apparatus 30, and the management apparatus 40) of the sound processing system 100 communicate with each other through a communication network 200. A representative example of the communication network 200 is the Internet. However, all components of the sound processing system 100 may be connected to each other by dedicated lines.

A terminal apparatus 10 is connected to the communication network 200. The terminal apparatus 10 is, for example, a personal computer or a portable information terminal (for example, a mobile phone). Each component (the registration apparatus 20, each sound processing apparatus 30, and the management apparatus 40) of the sound processing system 100 communicates with the terminal apparatus 10 by, for example, a system based on HTTP (Hyper Text Transfer Protocol). In practice, a plurality of terminal apparatuses 10 is connected to the communication network 200. However, in FIG. 1, for convenience of explanation, only one terminal apparatus 10 is shown. The following structure or process of one terminal apparatus 10 is the same as that of a plurality of terminal apparatuses 10 connected to the communication network 200.

The sound processing system 100 provides a sound processing proxy service (hereinafter, referred to as a "sound processing service") to the terminal apparatus 10. In brief, the sound processing service performs sound processing on audio data Da transmitted from the terminal apparatus 10 (that is, as a proxy) and transmits the processed data (hereinafter, referred to as "processed data") Db to the terminal apparatus 10. A process of giving sound effects (giving effects), such as a reverberant sound or specific frequency characteristics, is given as an example of the sound processing in the following description.

Figure 2:
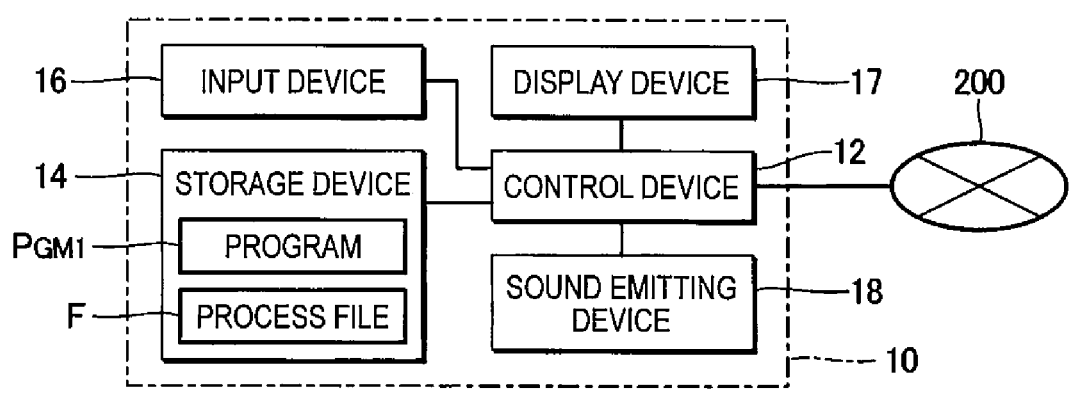
FIG. 2 is a block diagram illustrating a terminal apparatus.

FIG. 2 is a block diagram illustrating the terminal apparatus 10. As shown in FIG. 2, the terminal apparatus 10 includes a control device 12, a storage device 14, an input device 16, a display device 17, and a sound emitting device 18. The control device 12 executes a program PGM1 stored in the storage device 14 to perform various kinds of processes (which will be described below). The storage device 14 stores the program PGM1 or a process file F. The process file F is a data file to be subjected to sound processing by the sound processing system 100. A case in which waveform data indicating the time waveform of a performance sound or a singing sound of the music is used as the process file F is exemplified in the following description.

The input device 16 is a device (for example, a mouse or a keyboard) that receives instructions from the user. The display device (for example, a liquid crystal display device) 17 displays an image indicated by the control device 12. The sound emitting device (for example, a speaker or a head-phone) 18 emits sound waves in response to instructions from the control device 12. For example, the sound emitting device 18 emits a sound wave corresponding to the processed data Db transmitted from the sound processing system 100 or the process file F stored in the storage device 14.

Figure 3:
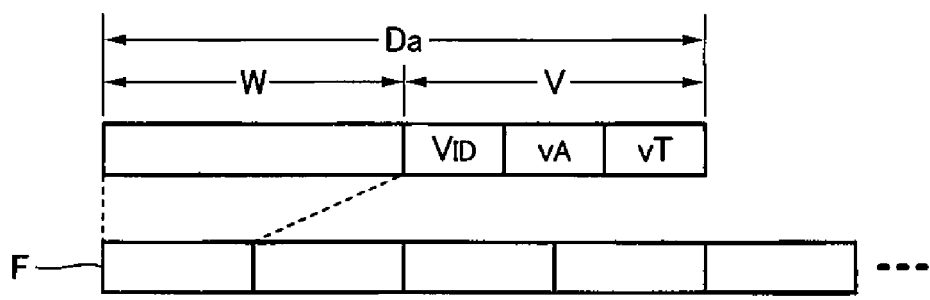
FIG. 3 is a diagram schematically illustrating audio data.

In the first embodiment, a plurality of data (streaming data) divided from the process file F stored in the storage device 14 is sequentially transmitted as the audio data Da to the sound processing apparatus 30 by a streaming method and is then sequentially processed by the sound processing apparatus 30. The processed data Db corresponding to the audio data Da are sequentially transmitted to the terminal apparatus 10 by the streaming method and is then reproduced. FIG. 3 is a diagram schematically illustrating one audio data Da. As shown in FIG. 3, the audio data Da include process target data W and variable setting data V.

The process target data W are time-series data to be subjected to sound processing. Specifically, as shown in FIG. 3, each of the plurality of waveform data (streaming data) divided from the process file F stored in the storage device 14 is included as one process target data W in the audio data Da. The process target data W include a plurality of frames (a section with a predetermined length which is a unit of a process). The total number of frames forming one process target data W is different in each audio data Da.

The variable setting data V designate the value of a variable (hereinafter, referred to as a "process variable") X reflected to sound processing and includes a variable identifier VID, a set value vA, and timing data vT. The process variable X is the order of, for example, reverberant time or a reflected sound for sound processing that adds a reverberant sound, and is a gain in each band for sound processing (equalizing) that changes frequency characteristics. The variable identifier VID is a code for identifying the kind of process variable X (for example, the name of the process variable X). The set value vA means a value designated to the process variable X and is set to be variable depending on the operation of the input device 16 by the user. The timing data vT is information designating the time when the value of the process variable X is changed to the set value vA. For example, the timing data vT designates the time elapsed from the head of the process target data W (the number of frames).

Figure 4:
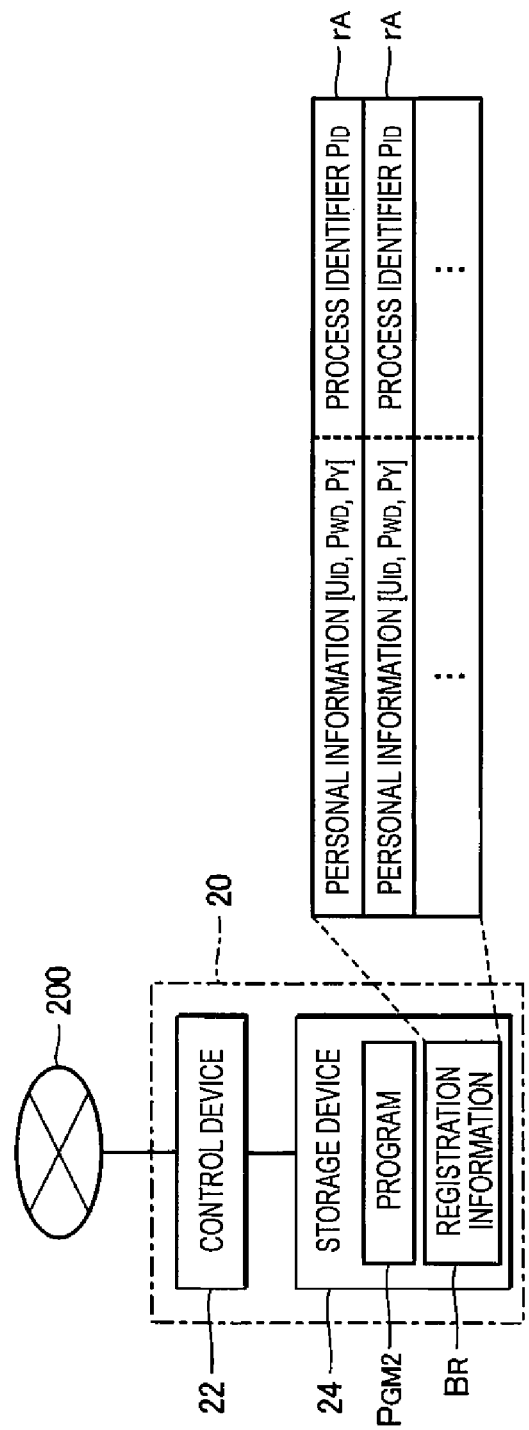
FIG. 4 is a block diagram illustrating a registration apparatus.

The user who wants to use the sound processing service registers the use of the sound processing service in advance. The registration apparatus 20 shown in FIG. 1 manages registration for use. As shown in FIG. 4, the registration apparatus 20 is implemented by a computer system including a control device 22 and a storage device 24. The control device 22 executes a program PGM2 stored in the storage device 24 to perform various kinds of processes (which will be described below). The storage device 24 stores the program PGM2 or registration information BR. The registration information BR is a set of the records rA of each user who has completed the registration for use. Each of the records rA includes the identifier (hereinafter, referred to as a "user identifier") UID (user ID) of the user, a password PWD, payment information PY, and the identifier (hereinafter, referred to as a "process identifier") PID of sound processing that can be used by the user. The payment information PY is required for payment (billing) when the sound processing service is used and is, for example, personal information, such as the name and address of the user, and the credit card number of the user.

Figure 5:
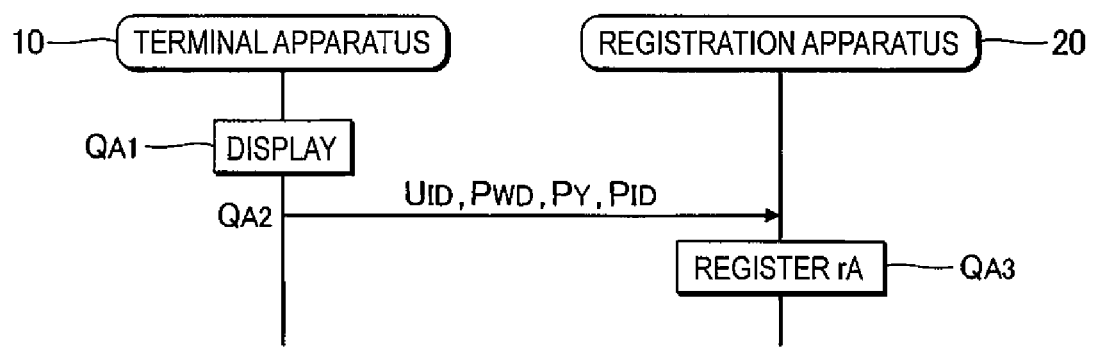
FIG. 5 is a diagram illustrating the procedure of registration for use.

FIG. 5 is a diagram illustrating the procedure of registration for use. The control device 12 of the terminal apparatus 10 starts up monitoring software in the program PGM1 to be connected to the registration apparatus 20 and controls the display device 17 to display a registration screen and a purchase screen provided by the registration apparatus 20 (QA1). The registration screen is an image used by the user to input personal information (UID, PWD, and PY). The purchase screen is an image used by the user to select a desired one of a plurality of articles. Each of the articles corresponds to a right to use the sound processing service. The kind of sound processing that can be used by the user is different for each article. A right to collectively use plural kinds of sound processing may be prepared as one article.

The control device 12 of the terminal apparatus 10 transmits the personal information (UID, PWD, and PY) input to the registration screen by the user and the process identifier PID of sound processing corresponding to the article designated by the user through the purchase screen to the registration apparatus 20 (QA2). The control device 22 of the registration apparatus 20 adds the record rA including the personal information (UID, PWD, and PY) and the process identifier PID received from the terminal apparatus 10 to the registration information BR (QA3). In addition, the terminal apparatus 10 may transmit the identifier of the article purchased by the user to the registration apparatus 20, and the control device 22 of the registration apparatus 20 may specify the process identifier PID of sound processing corresponding to the article to generate the record rA.

Each of the plurality of sound processing apparatuses 30 shown in FIG. 1 performs sound processing on the audio data Da. Each sound processing apparatus 30 selectively performs plural kinds of sound processing. In the following description, a case in which the kind of sound processing that can be provided is common to the plurality of sound processing apparatuses 30 is exemplified for convenience of explanation. However, the sound processing apparatuses 30 may perform different kinds of sound processing.

Figure 6:
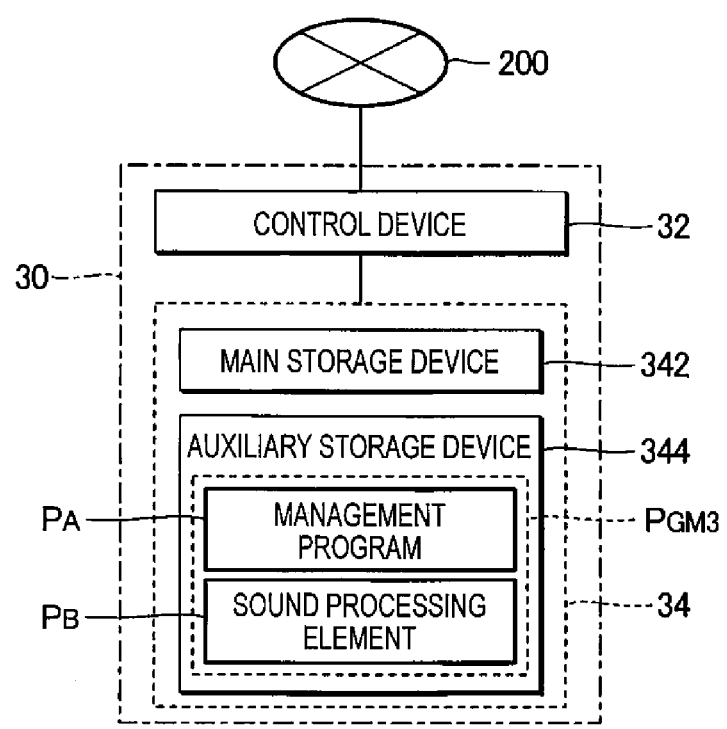
FIG. 6 is a block diagram illustrating a sound processing apparatus.

FIG. 6 is a block diagram illustrating the sound processing apparatus 30. As shown in FIG. 6, the sound processing apparatus 30 is implemented by a computer system including a control device 32 and a storage unit 34. The storage unit 34 includes a main storage device (primary storage device) 342 and an auxiliary storage device (secondary storage device) 344. The main storage device 342 is a recording medium (for example, semiconductor recording medium) which data can be directly written to or read from by the control device 32. The auxiliary storage device 344 is a recording medium (for example, magnetic recording medium) that has a write or read speed lower than that of the main storage device 342, but has a capacity higher than that of the main storage device 342. A program PGM3 is stored in the auxiliary storage device 344. The control device 32 executes the program PGM3 stored in the auxiliary storage device 344 to perform various kinds of processes (which will be described below).

As shown in FIG. 6, the program PGM3 includes a management program (server program) PA for managing communication with the terminal apparatus 10 or the management apparatus 40 through the communication network 200 and a sound processing program PB for implementing sound processing. The sound processing program PB is provided in, for example, a plug-in (for example, VST (Virtual Studio Technology) plug-in) format that expands the function of the sound processing apparatus 30 ("VST" is a registered trademark).

Figure 7:
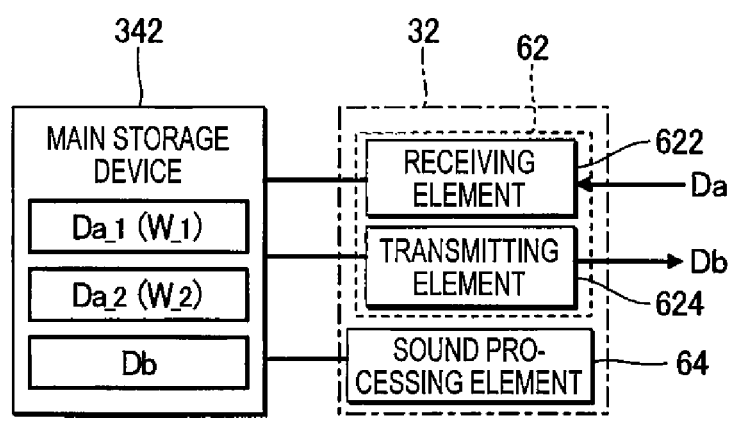
FIG. 7 is a block diagram illustrating the functional structure of the sound processing apparatus.

FIG. 7 is a block diagram illustrating the functional structure of the sound processing apparatus 30. As shown in FIG. 7, the control device 32 functions as a management element 62 and a sound processing element 64. The management element 62 is implemented by executing the management program PA and manages communication with the terminal apparatus 10 or the management apparatus 40 through the communication network 200. The management element 62 includes a receiving element 622 and a transmitting element 624. The receiving element 622 receives the audio data Da sequentially transmitted from the terminal apparatus 10 and sequentially stores the received data in the main storage device 342. The transmitting element 624 sequentially transmits the processed data Db generated from the audio data Da to the terminal apparatus 10.

The sound processing element 64 is implemented by executing the sound processing program PB, performs sound processing on the audio data Da that is stored in the main storage device 342 by the management element 62 to generate the processed data Db, and stores the generated data in the main storage device 342. The sound processing element 64 can selectively perform plural kinds of sound processing.

The management program PA and the sound processing program PB is resident in the main storage device 342. That is, the management program PA and the sound processing program PB are not read from the auxiliary storage device 344 to the main storage device 342 whenever there is a request to process the audio data Da, but are read from the auxiliary storage device 344 to the main storage device 342 when the sound processing apparatus 30 starts (when an OS starts). When the sound processing apparatus 30 is being operated, the management program PA and the sound processing program PB are maintained such that the audio data Da can be processed all the time (the management element 62 and the sound processing element 64 is operated).

Figure 8:
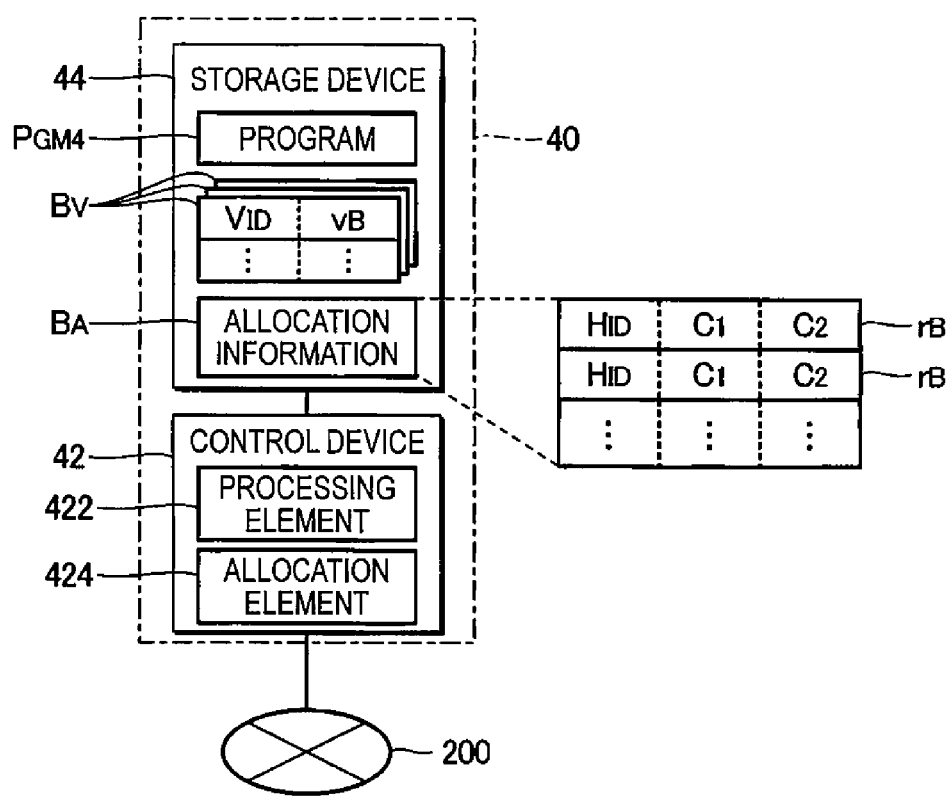
FIG. 8 is a block diagram illustrating a management apparatus.

The management apparatus 40 shown in FIG. 1 manages the overall sound processing service using the plurality of sound processing apparatuses 30. As shown in FIG. 8, the management apparatus 40 is implemented by a computer system including a control device 42 and a storage device 44. The control device 42 executes a program PGM4 stored in the storage device 44 to perform various kinds of functions (a processing element 422 and an allocation element 424). The processing element 422 is a component that manages the sound processing service and performs various kinds of processes, such as preparations for the authentication of the user of the terminal apparatus 10 or communication with the terminal apparatus 10. The allocation element 424 selects the sound processing apparatus 30 that provides the sound processing service to the terminal apparatus 10 from the plurality of sound processing apparatuses 30.

The storage device 44 stores the program PGM4 executed by the control device 42, a plurality of variable information BV corresponding to different kinds of sound processing, and allocation information BA used to allocate the sound processing apparatus 30 to the terminal apparatus 10. One variable information BV corresponding to each kind of sound processing is information related to the process variable X (singular or plural) applied to the sound processing. Specifically, the variable information BV includes the variable identifier VID of the process variable X and an indication value vB for each process variable X of the sound processing. The indication value vB of the variable information BV is used to set the set value vA (FIG. 3) of the process variable X to the terminal apparatus 10. For example, the initial value or the numerical range (the maximum value and the minimum value) of the process variable X is designated as the indication value vB by the variable information BV.

The allocation information BA shown in FIG. 8 indicates the state of the load of each sound processing apparatus 30. As shown in FIG. 8, the allocation information BA is a set of the records rB of each sound processing apparatus 30. Each of the records rB includes the identifier (hereinafter, referred to as an "apparatus identifier") HID (host ID) of the sound processing apparatus 30, a startup state C1, and a load state C2. The apparatus identifier HID includes, for example, information (an IP address or a port number) indicating the location of the sound processing apparatus 30. The startup state C1 is information (flag) indicating the starting/stopping of the sound processing apparatus 30 and the load state C2 is information indicating the state of the load of the sound processing apparatus 30 (for example, the number of terminal apparatuses 10 receiving the sound processing service from the sound processing apparatus 30). The records rB of only the sound processing apparatus 30 that is being operated may be generated (therefore, the startup state C1 may be omitted).

Figure 9:
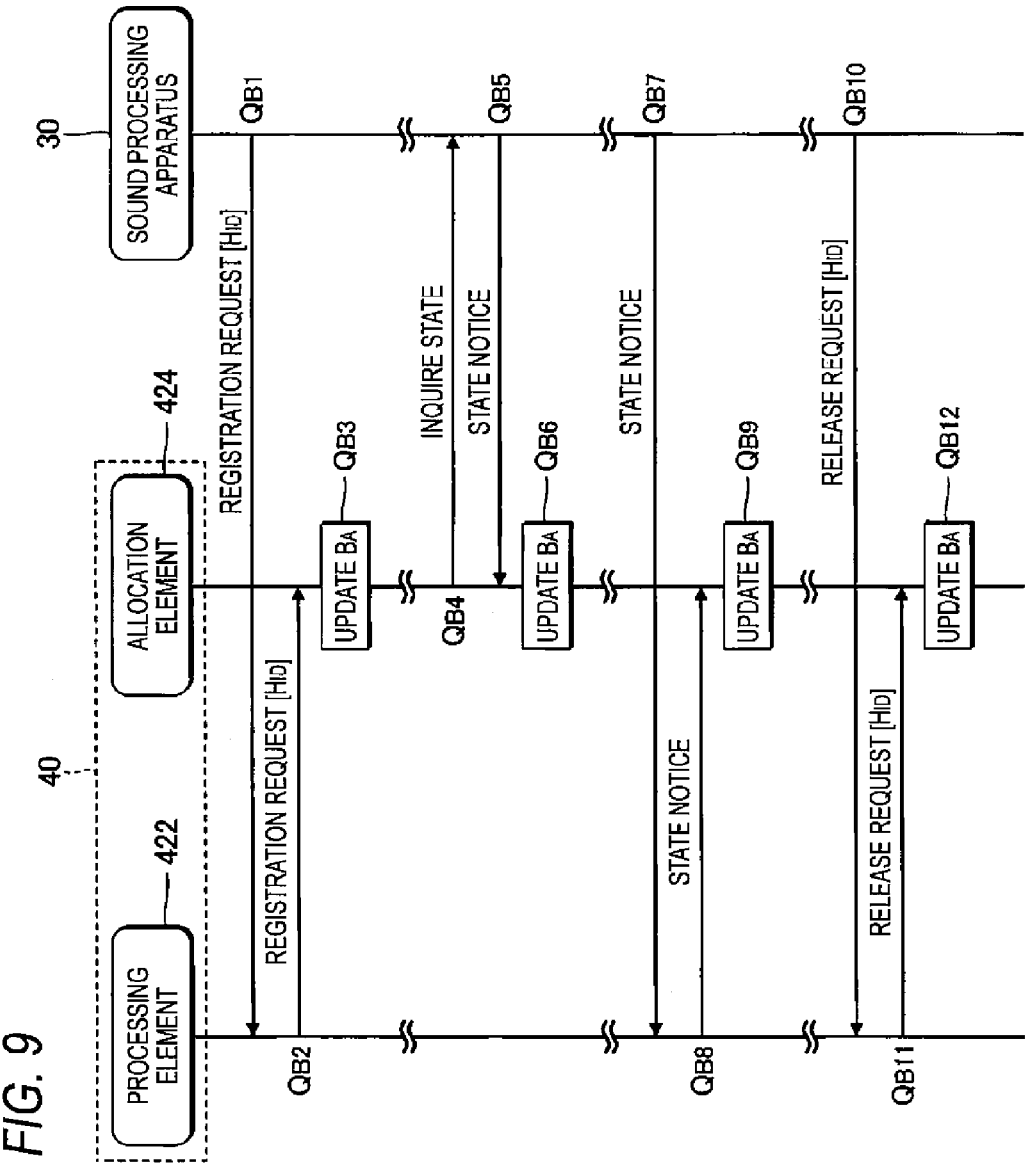
FIG. 9 is a diagram illustrating a process of updating allocation information.

FIG. 9 is a diagram illustrating a process of updating the allocation information BA. As shown in FIG. 9, when the sound processing apparatus 30 starts up, the management element 62 transmits a registration request including its own apparatus identifier HID to the management apparatus 40 (QB1). The processing element 422 of the management apparatus 40 transmits the registration request received from the sound processing apparatus 30 to the allocation element 424 (QB2). When receiving the registration request, the allocation element 424 updates the startup state C1 corresponding to the apparatus identifier HID designated by the registration request in the allocation information BA with a value indicating that the sound processing apparatus 30 is being operated (QB3).

The allocation element 424 updates the load state C2 corresponding to the state of the load of the sound processing apparatus 30 at any time at the same time when the sound processing service is provided to the terminal apparatus 10. Specifically, for example, when an interrupt is generated at a predetermined interval, the allocation element 424 transmits a state inquiry to each of the plurality of sound processing apparatuses 30 (QB4). When receiving the state inquiry, the management element 62 of the sound processing apparatus 30 transmits a state notice indicating its load state to the allocation element 424 of the management apparatus 40 (QB5). The allocation element 424 updates the load state C2 of the allocation information BA according to the state notice received from the sound processing apparatus 30 (QB6). In addition, for example, when an interrupt is generated at a predetermined interval, each of the plurality of sound processing apparatuses 30 transmits a state notice indicating its own load state to the management apparatus 40 (QB7). When receiving the state notice through the processing element 422 of the management apparatus 40 (QB8), the allocation element 424 updates the load state C2 of the allocation information BA according to the state notice, similar to Step QB6 (QB9).

When the stopping of the sound processing apparatus 30 is instructed, the management element 62 transmits a release request including its own apparatus identifier HID to the management apparatus 40 (QB10). When receiving the release request through the processing element 422 of the management apparatus 40 (QB11), the allocation element 424 updates the startup state C1 corresponding to the apparatus identifier HID designated by the release request in the allocation information BA with content indicating that the sound processing apparatus stops (QB12). When the above-mentioned process is sequentially performed on each of the plurality of sound processing apparatuses 30, the allocation information BA is maintained as content indicating the latest state of each sound processing apparatus 30.

A-2: Operation

Figure 10:
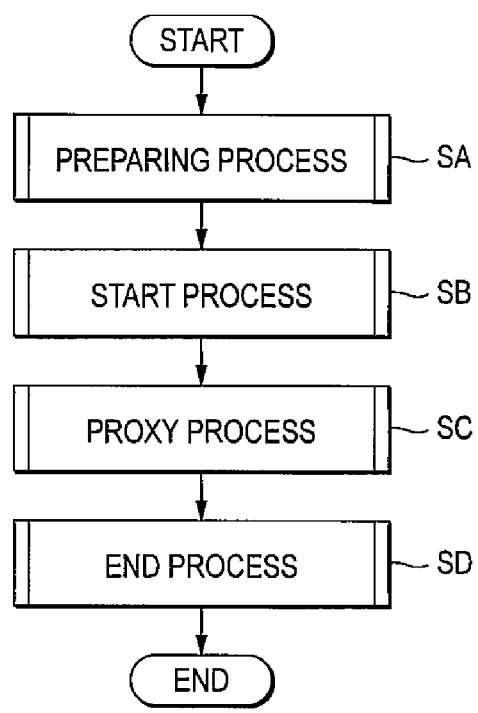
FIG. 10 is a diagram schematically illustrating the procedure of a sound processing service.

FIG. 10 is a flowchart schematically illustrating the overall process of the sound processing system 100. First, when the terminal apparatus 10 requests communication with the sound processing system 100, a preparing process required to start the communication between the terminal apparatus 10 and the sound processing system 100 is performed (SA). Then, a start process required to provide the sound processing service to the terminal apparatus 10 is performed (SB). The start process SB includes the allocation of the sound processing apparatus 30 to the terminal apparatus 10. When the start process SB is completed, a process (hereinafter, referred to as a "proxy process") of actually providing the sound processing service to the terminal apparatus 10 is performed (SC). When the proxy process SC ends, a process (hereinafter, referred to as an "end process") required to end the sound processing service is performed (SD). The detailed procedure of each process will be described below.

Figure 11:
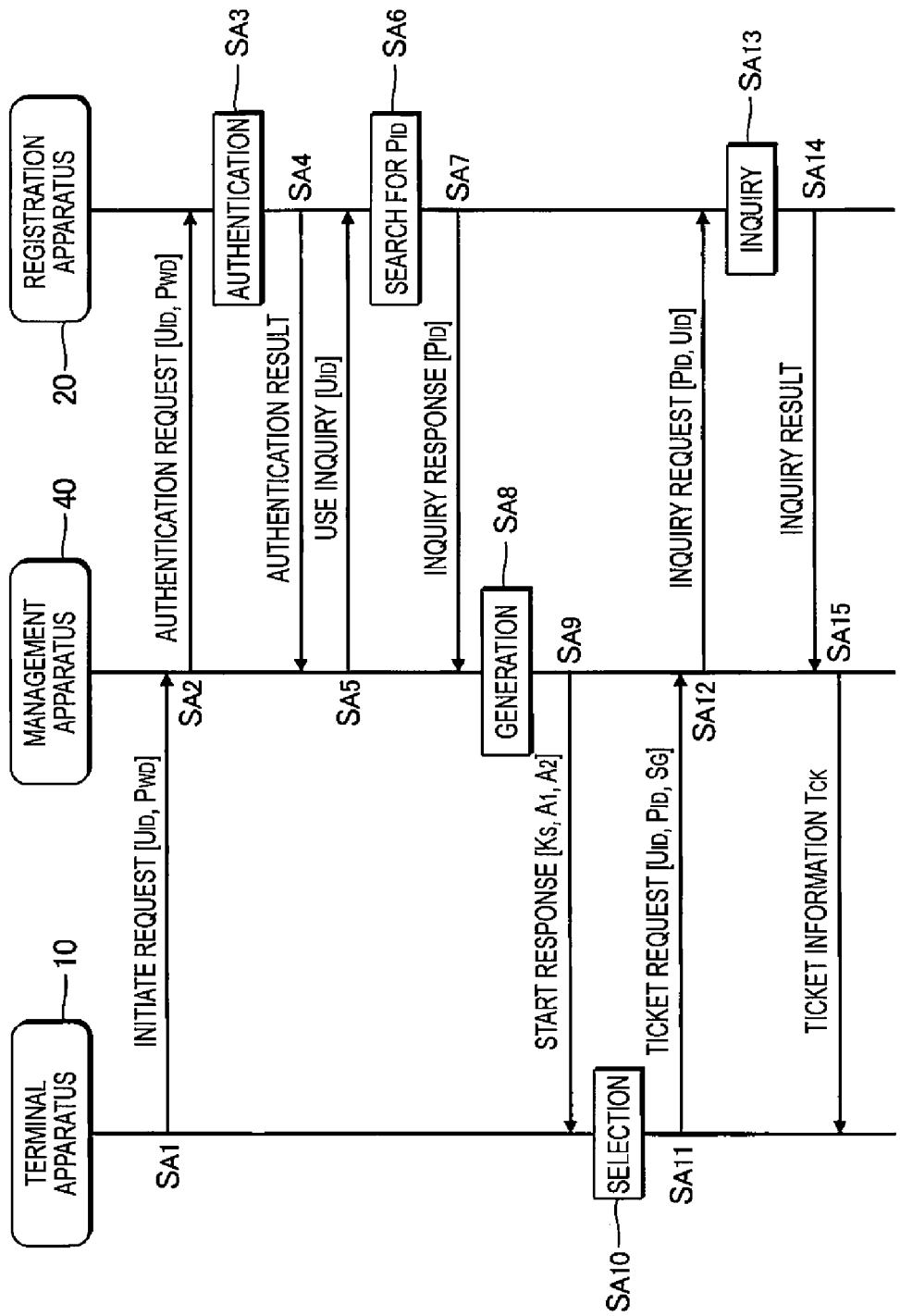
FIG. 11 is a diagram illustrating a preparing process.

[1] Preparing Process SA (FIG. 11)

FIG. 11 is a diagram illustrating the procedure of the preparing process SA. When the user uses the input device 16 to input information, the control device 12 of the terminal apparatus 10 transmits a request (INITIATE request) to start the sound processing service to the management apparatus 40 (SA1). The INITIATE request includes the user identifier UID and the password PWD input to the input device 16 by the user. When receiving the INITIATE request, the processing element 422 of the management apparatus 40 transmits an authentication request including the user identifier UID and the password PWD in the INITIATE request to the registration apparatus 20 (SA2). The control device 22 of the registration apparatus 20 inquires the user identifier UID and the password PWD in the authentication request received from the management apparatus 40 and the registration information BR in the storage device 24 to verify the validity of the user (SA3). Specifically, when the record rA including the user identifier UID and the password PWD exists in the registration information BR, the control device 22 accepts the validity of the user. When the record rA does not exist in the registration information BR, the control device 22 rejects the validity of the user. The control device 22 transmits the authentication result to the management device 40 (SA4).

When the authentication result received from the registration apparatus 20 is "No", the processing element 422 of the management apparatus 40 notifies the user of the terminal apparatus 10 that the authentication has failed and ends the process (not shown). On the other hand, when the authentication result is "Yes", the processing element 422 makes an inquiry (use inquiry) regarding the sound processing (purchased sound processing) that can be used by the user of the registration apparatus 20 (SA5). The use inquiry includes the user identifier UID. The control device 22 of the registration apparatus 20 searches for each process identifier PID (that is, the process identifier PID of sound processing that can be used by the user) corresponding to the user identifier UID in the use inquiry from the registration information BR of the storage device 24 (SA6), and transmits an inquiry response (a list of the process identifiers PID) including each process identifier PID to the management apparatus 40 (SA7).

When receiving the inquiry response from the registration apparatus 20, the processing element 422 of the management apparatus 40 generates a secret key KS, a public key KP, usable process information A1, and usable variable information A2 and stores them in the storage device 44 (SA8). Any known technique may be used to generate the secret key KS and the public key KP. Instead of a method of using the secret key KS and the public key KP (digital signature), any known technique using a message authentication code may be used to authenticate (verify the validity of) information transmitted between the terminal apparatus 10 and the sound processing system 100.

The usable process information A1 is information (that is, a list of sound processing corresponding to the purchased articles) designating sound processing that can be used by the user and includes each process identifier PID in the inquiry response. The usable variable information A2 relates to the process variable X of sound processing indicated by each process identifier PID in the inquiry response. The processing element 422 selectively extracts the variable information BV of the sound processing indicated by each process identifier PID in the inquiry request from a plurality of variable information BV that is stored in the storage device 44 for each sound processing and includes the extracted variable information in the usable variable information A2. That is, the usable variable information A2 is a set (parameter list) of the variable information BV of sound processing that can be used by the user among plural kinds of sound processing.

The processing element 422 of the management apparatus 40 transmits a start response to the terminal apparatus 10 (SA9). The start response includes the secret key KS, the usable process information A1, and the usable variable information A2 generated in Step SA8. The control device 12 of the terminal apparatus 10 stores each information (KS, A1, and A2) in the start response received from the management apparatus 40 in the storage device 14 and controls the display device 17 to display a list of sound processing operations indicated by the usable process information A1 as selection candidates of the user (SA10).

When the user operates the input device 16 to select the desired sound processing, the control device 12 of the terminal apparatus 10 transmits a request for ticket information TCK (TICKET request) to the management apparatus 40 (SA11). The ticket information TCK means the permission for the use of the sound processing service. The TICKET request includes a user identifier UID, signature information SG, and the process identifier PID of the sound processing selected by the user in Step SA10. The signature information SG is generated from the user identifier UID and the process identifier PID by an operation using the secret key KS.

When receiving the TICKET request from the terminal apparatus 10, the processing element 422 of the management apparatus 40 uses the public key KP in the storage device 44 to verify the validity of the signature information SG in the TICKET request. When the signature information SG is valid, the processing element 422 transmits an inquiry request including the user identifier UID and the process identifier PID in the TICKET request to the registration apparatus 20 (SA12). When the signature information SG is invalid, the processing element 422 transmits a notice indicating the rejection of the TICKET request to the user of the terminal apparatus 10 and ends the process (not shown).

The control device 22 of the registration apparatus 20 determines whether the payment information PY is registered in the record rA including the user identifier UID and the process identifier PID in the inquiry request that is received from the management apparatus 40 (SA13), and transmits the determination result (inquiry result) to the management apparatus 40 (SA14). When the inquiry result is "No", the processing element 422 of the management apparatus 40 transmits a notice indicating the rejection of the TICKET request to the user of the terminal apparatus 10 and ends the process (not shown). On the other hand, when the inquiry result is "Yes", the processing element 422 of the management apparatus 40 generates the ticket information TCK and transmits it to the terminal apparatus 10 (SA15). The ticket information TCK is generated so as to be changed for each communication (session) between the terminal apparatus 10 and the sound processing system 100. The control device 12 of the terminal apparatus 10 stores the ticket information TCK received from the management apparatus 40 in the storage device 14.

Figure 12:
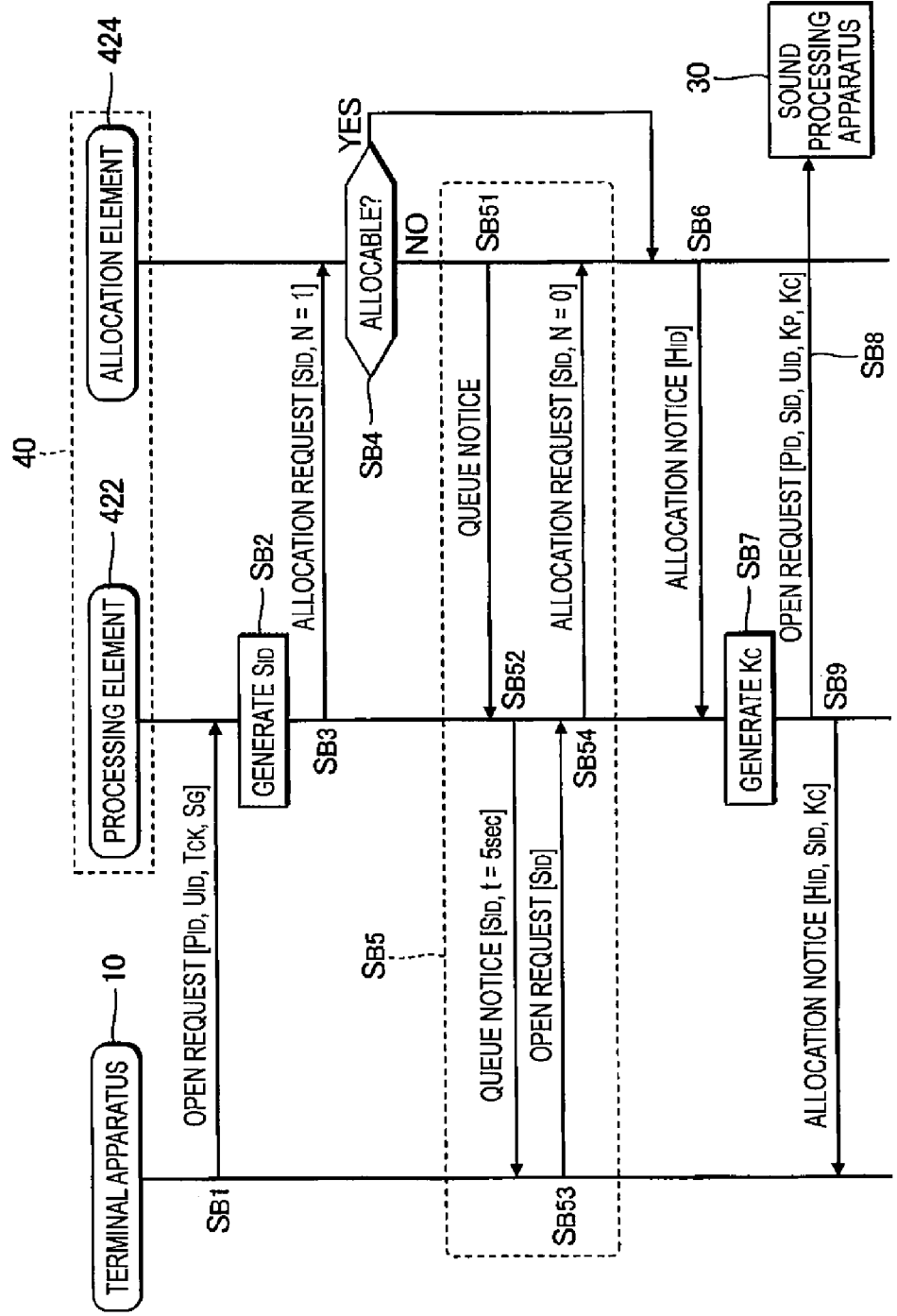
FIG. 12 is a diagram illustrating a start process.

[2] Start Process SB (FIG. 12)

When communication with the sound processing system 100 is permitted by the above-mentioned preparing process SA, the start process SB required to provide the sound processing service to the terminal apparatus 10 is performed. FIG. 12 is a diagram illustrating the procedure of the start process SB. The control device 12 of the terminal apparatus 10 transmits a request (OPEN request) to start the sound processing service to the management apparatus 40 (SB1). The OPEN request includes the process identifier PID of the sound processing selected by the user in Step SA10, the user identifier UID, the ticket information TCK acquired by the preparing process (SA15), and the signature information SG generated from the above-mentioned information (PID, UID, and TCK) using the secret key KS.

When the OPEN request received from the terminal apparatus 10 includes the valid ticket information TCK, the processing element 422 of the management apparatus 40 generates a session identifier SID (session ID) and stores it in the storage device 44 (SB2). When the OPEN request does not include the valid ticket information TCK, the processing element 422 transmits a notice indicating the rejection of the OPEN request to the terminal apparatus 10 and ends the process (not shown).

When the session identifier SID is generated, the processing element 422 transmits a request (allocation request) to allocate the sound processing apparatus 30 to the terminal apparatus 10 to the allocation element 424 (SB3). The allocation request includes the session identifier SID generated in Step SB2 and information (flag) N indicating whether the allocation request is the first request. Since the allocation request is the first request in the current stage, the information N is set to "1" indicating the first request.

When receiving the allocation request, the allocation element 424 determines whether there is a sound processing apparatus 30 that can be allocated to the terminal apparatus 10 with reference to the allocation information BA (SB4). For example, the allocation element 424 determines whether there is a sound processing apparatus 30 having the startup state C1 of the allocation information BA indicating startup and the load state C2 (the number of terminal apparatuses 10 receiving the sound processing service) smaller than a predetermined threshold value. When there is no sound processing apparatus 30 that can be allocated, a retry process SB5 (SB51 to SB54) including the transmission of a notice (QUEUE notice) for waiting for allocation and the retransmission of the OPEN request from the terminal apparatus 10 is repeated (polling process). On the other hand, when it is determined in Step SB4 that there is a sound processing apparatus 30 that can be allocated, the allocation element 424 proceeds to Step SB6 without performing the retry process SB5.

When the retry process SB5 is performed, the allocation element 424 of the management apparatus 40 transmits a QUEUE notice for a request to wait for allocation to the processing element 422 (SB51). When receiving the QUEUE notice, the processing element 422 adds the session identifier SID generated in Step SB2 and the retransmission time t of the OPEN request to the QUEUE notice and transmits the QUEUE notice to the terminal apparatus 10 (SB52). The control device 12 of the terminal apparatus 10 stores the session identifier SID in the QUEUE notice received from the management apparatus 40 in the storage device 14. When a retransmission time t designated by the QUEUE notice has come, the control device 12 retransmits the OPEN request to the management apparatus 40 (SB53). For example, the control device 12 retransmits the OPEN request after the time (for example, 5 seconds) designated by the retransmission time t has elapsed from the reception of the QUEUE notice. The second or subsequent OPEN requests include the session identifier SID. The processing element 422 of the management apparatus 40 transmits an allocation request in which the information N that is set to "0" indicating the second or subsequent OPEN requests is added to the OPEN request to the allocation element 424 (SB54). The above-mentioned retry process SB5 (SB51 to SB54) is sequentially repeated until the sound processing apparatus 30 can be allocated to the terminal apparatus 10.

When the allocation of the sound processing apparatus 30 becomes available while the retry process SB5 is being performed, or when the determination result is "Yes" in Step SB4, the allocation element 424 transmits an allocation notice to the processing element 422 (SB6). The allocation notice includes the apparatus identifier HID of the sound processing apparatus 30 allocated to the terminal apparatus 10. When receiving the allocation notice, the processing element 422 generates the common key (session key) KC applied to the communication of the current sound processing service (SB7).

The processing element 422 of the management apparatus 40 transmits the OPEN request to the sound processing apparatus 30 specified by the apparatus identifier HID in the allocation notice (SB8). The OPEN request for the sound processing apparatus 30 includes each information (PID and UID) received from the terminal apparatus 10 in Step SB1, the public key KP generated by the preparing process SA (SA8), and the session identifier SID and the common key KC generated by the current start process SB (SB2 and SB7). The management element 62 of the sound processing apparatus 30 stores each information (PID, UID, KP, SID, and KC) in the OPEN request received from the management apparatus 40 in the storage element 34 (main storage device 342).

The processing element 422 of the management apparatus 40 transmits an allocation notice to the terminal apparatus 10 (SB9). The allocation notice includes the session identifier SID and the common key KC generated by the current start process SB (SB2 and SB7), and the apparatus identifier HID of the sound processing apparatus 30 selected by the allocation element 424. The control device 12 of the terminal apparatus 10 stores each information (HID, SID, and KC) in the allocation notice received from the management apparatus 40 in the storage element 14. When the above-mentioned start process SB is performed, the session identifier SID and the common key KC are shared by the terminal apparatus 10 and the sound processing apparatus 30. Information transmitted between the terminal apparatus 10 and the management apparatus 40 when the preparing process SA or the start process SB is performed is encoded by, for example, a method based on SSL (Secure Socket Layer).

Figure 13:
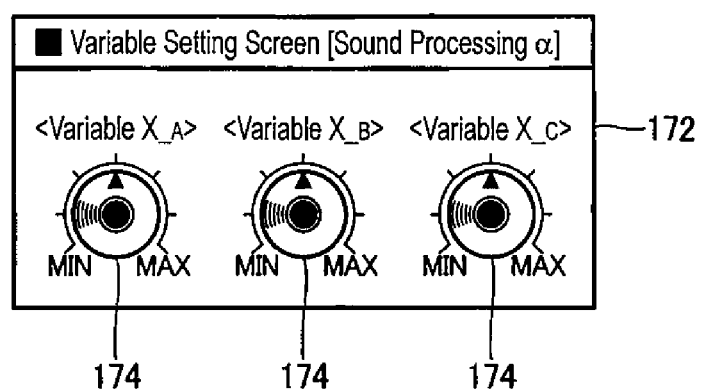
FIG. 13 is a diagram schematically illustrating a variable setting screen.

[3] Proxy Process SC (FIG. 13)

When the preparing process SA and the start process SB are completed, the transmission of the audio data Da from the terminal apparatus 10 to the sound processing apparatus 30, the execution (the generation of the processed data Db) of sound processing on the audio data Da, and the transmission of the processed data Db from the sound processing apparatus 30 to the terminal apparatus 10 are sequentially performed in parallel.

The user can appropriately operate the input device 16 to change the set value vA of the process variable X at anytime during the execution of the proxy process SC (the reception and transmission of the audio data Da or the processed data Db). The usable variable information A2 (parameter list) received from the management apparatus 40 by the preparing process SA (SA9) is used to set (change) the process variable X, which will be described below.

The control device 12 of the terminal apparatus 10 controls the display device 17 to display a variable setting screen 172 for each sound processing operation selected by the user in the preparing process SA (SA10). The variable setting screen 172 corresponding to one sound processing operation is an image that is viewed by the user when the process variable X of the sound processing is set. As shown in FIG. 13, the variable setting screen 172 includes a plurality of operators 174 corresponding to the process variable X (X_A, X_B, and X_C) of the sound processing (sound processing α). The user can use the input device 16 to operate each of the operators 174.

The control device 12 sets the set value vA of the process variable X on the basis of the usable variable information A2 (variable information BV) received from the management apparatus 40 and the operation of the user for each operator 174. For example, when the indication value vB of the variable information BV included in the usable variable information A2 indicates the initial value or the numerical range of the process variable X, the control device 12 sets the set value vA of the process variable X to be variable from the initial value indicated by the indication value vB in the numerical range indicated by the indication value vB on the basis of the operation of the user for the operators 174. When the user does not instruct the change of the process variable X, the control device 12 sets the initial value indicated by the indication value vB of the variable information BV included in the usable variable information A2 as the set value vA.

When the set value vA of the process variable X is indicated by the above-mentioned process during the execution of the proxy process SC, the control device 12 adds variable setting data V including the variable identifier VID of the process variable X, the set value vA indicated by the user, and timing data vT indicating the change time of the process variable X (for example, the time when the user indicates the set value vA) to the next audio data Da. Each time the user indicates the set value vA, the variable setting data V are added to the audio data Da, as shown in FIG. 3. When the set value vA is not changed, the variable setting data V are not added.

Figure 14:
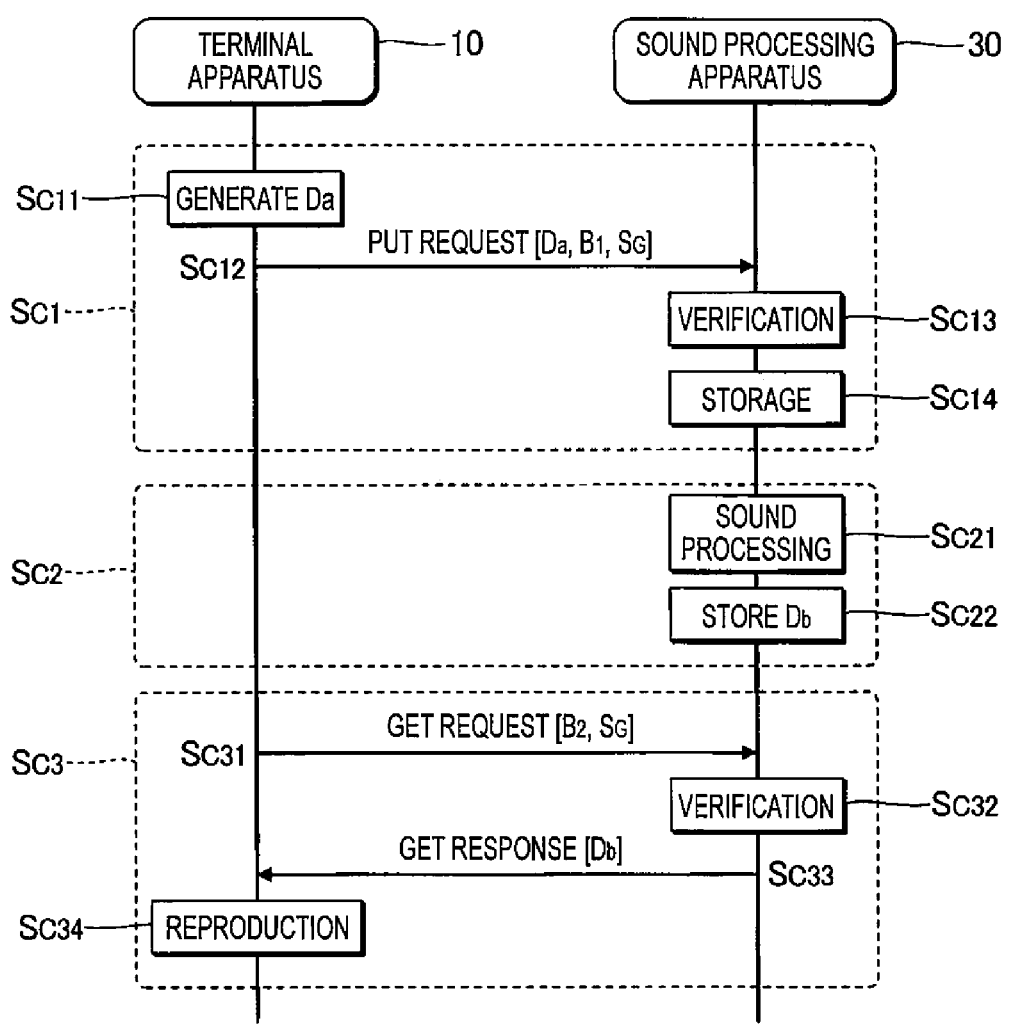
FIG. 14 is a diagram illustrating a proxy process.

FIG. 14 is a diagram illustrating the procedure of the proxy process SC. As shown in FIG. 14, the proxy process SC includes a transmitting process SC1 (SC11 to SC14), a processing operation SC2 (SC21 and SC22), and a return process SC3 (SC31 to SC34). The transmitting process SC1 is sequentially performed on each process target data W divided from the process file F and the processing operation SC2 is sequentially performed on each transmitting process SC1. The return process SC3 is sequentially performed for each processed data Db. The transmitting process SC1 and the return process SC3 may be asynchronously performed.

When the transmitting process SC1 starts, the control device 12 of the terminal apparatus 10 generates the audio data Da including one process target data W divided from the process file F that is stored in the storage device 14 (SC11). When the set value vA of the process variable X is indicated by the user, the variable setting data V are added to the audio data Da. The control device 12 transmits a request (PUT request) to perform sound processing on the audio data Da generated in Step SC11 to the sound processing apparatus 30 (SC12). The sound processing apparatus 30 (that is, the sound processing apparatus 30 allocated to the terminal apparatus 10 by the allocation element 424) corresponding to the apparatus identifier HID received from the management apparatus 40 by the start process SB (SB9) shown in FIG. 12 is selected as the destination of the PUT request. For example, the PUT request is sequentially transmitted at a predetermined interval.

The PUT request includes the audio data Da, additional information B1, and the signature information SG. The additional information B1 includes the user identifier UID input by the user of the terminal apparatus 10, the session identifier SID received from the management apparatus 40 by the start process SB (SB53 and SB9), and the size (for example, the number of frames) of the process target data W in the audio data Da. The signature information SG is generated from the audio data Da and the additional information B1 by an operation using the secret key KS received by the preparing process SA (SA9). The audio data Da are encoded using the common key KC received from the management apparatus 40 by the start process SB (SB9). Only the additional information B1 may be used to generate the signature information SG, thereby reducing the process load.

When receiving the PUT request, the receiving element 622 of the sound processing apparatus 30 verifies the validity of the signature information SG in the PUT request using the public key KP acquired from the management apparatus 40 by the start process SB (SB8) (SC13). When the signature information SG is invalid, a notice indicating the rejection of the PUT request is transmitted to the user of the terminal apparatus 10 and the process ends (not shown). On the other hand, when the signature information SG is valid, the receiving element 622 decodes the audio data Da in the PUT request using the common key KC acquired from the management apparatus 40 by the start process SB (SB8) and stores the decoded audio data Da in the main storage device 342 (SC14). The transmitting process SC1 has been described above.

The sound processing element 64 of the sound processing apparatus 30 performs the processing operation SC2 on the audio data Da stored in the main storage device 342 by the management element 62 (the receiving element 622). Specifically, the sound processing element 64 sequentially performs each sound processing operation (that is, the sound processing selected by the user in Step SA10) of the process identifier PID received from the management apparatus 40 by the start process SB (SB8) on the process target data W in the audio data Da and generates the processed data Db (SC21). That is, a sound effect corresponding to the sound processing selected by the user is added to the process target data W to generate the processed data Db. The sound processing element 64 sequentially stores the processed data Db generated by sound processing in the main storage device 342 (SC22). The above-mentioned processing operation SC2 (SC21 and SC22) is sequentially performed in parallel to the transmitting process SC1 each time the audio data Da are stored in the main storage device 342 by the transmitting process SC1 (SC12). That is, the audio data Da (process file F) are received and transmitted and are then processed by the streaming method.

The set value vA indicated by the variable setting data V in the audio data Da is applied to each sound processing operation (SC21) for the process target data W in the audio data Da. That is, the sound processing element 64 changes the value of the process variable X indicated by the variable identifier VID of the variable setting data V to the set value vA at the time indicated by the timing data vT and then performs sound processing. Therefore, an instruction (set value vA) from the user is reflected to the sound indicated by the processed data Db. Any known technique is used to perform sound processing or control the process variable X.

Figure 15:
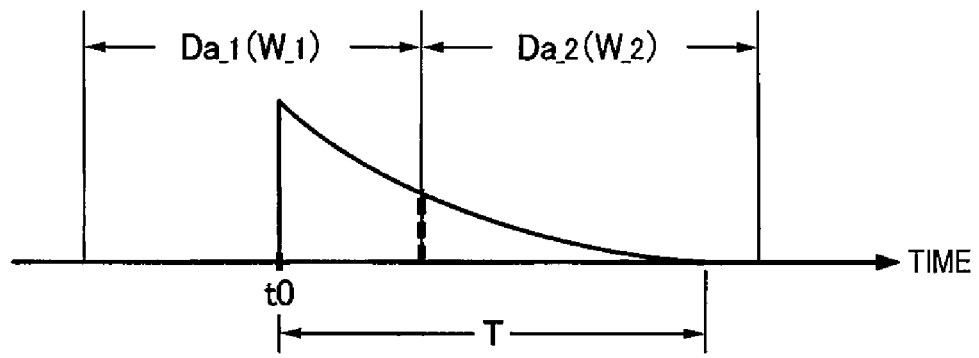
FIG. 15 is a diagram illustrating a detailed example of sound processing.

However, in some cases, the sound effect added to a sound by sound processing at a specific time affects the subsequent sound. For example, as shown in FIG. 15, a reverberant sound that is added to a sound at a time t0 by sound processing (the addition of the reverberant sound) is maintained for the next period T. Therefore, in the structure in which the sound processing element 64 generates the processed data Db from one process target data W_2 shown in FIG. 15 (that is, process target data W_1 is not added), the reverberant sound generated by the sound processing of the previous process target data W_1 is discontinuously reduced at the head of the process target data W_2, as represented by a dashed line in FIG. 15 and the sound is likely to sound unnatural. Therefore, in the first embodiment, sound processing is performed such that the influence of the previous process target data W_1 is reflected to the processed data Db generated from the process target data W_2, which will be described below.

As shown in FIG. 7, the management element 62 (receiving element 622) sequentially stores the audio data Da in the main storage device 342 such that the latest audio data Da_2 (process target data W_2) and the previous audio data Da_1 (process target data W_1) among the audio data Da sequentially received from the terminal apparatus 10 are stored in the main storage device 342. Specifically, when receiving new audio data Da from the terminal apparatus 10, the management element 62 erases the old audio data Da of two previous audio data Da in the main storage device 342 and stores the new audio data Da in the main storage device 342.

The sound processing element 64 performs sound processing on the latest process target data W_2 considering the influence of the previous process target data W_1 to generate the processed data Db corresponding to the process target data W_2. For example, the sound processing element 64 performs sound processing such that the reverberant sound added to the process target data W_1 by the previous sound processing is maintained in the processed data Db after sound processing is performed on the process target data W_2 and a sound is continuous at the boundary between the processed data Db of the process target data W_1 and the processed data Db of the process target data W_2.

According to the above-mentioned structure, a discontinuous reduction in the sound effect added to the process target data W_1 at the head of the process target data W_2 is prevented. Therefore, it is possible to naturally connect the reproduced sound of each processed data Db in terms of audibility. In addition, since the audio data Da other than the audio data Da (Da_1 and Da_2) used in the sound processing are erased from the main storage device 342, it is possible to reduce the capacity required for the main storage device 342, as compared to the structure in which the audio data Da corresponding to the entire process file F are stored in the main storage device 342.

The return process SC3 shown in FIG. 14 transmits the processed data Db generated by the sound processing element 64 to the terminal apparatus 10. The control device 12 of the terminal apparatus 10 transmits a request (GET request) for the processed data Db to the sound processing apparatus 30 (SC31). The sound processing apparatus 30 with the apparatus identifier HID notified by the start process SB (SB9) is selected as the destination of the GET request. For example, the GET request is sequentially transmitted at a predetermined interval.

The GET request includes additional information B2 and the signature information SG. The additional information B2 includes the user identifier UID, the session identifier SID, and the size (for example, the number of frames) of the processed data Db required for the sound processing apparatus 30, similar to the additional information B1 of the PUT request. The signature information SG is generated from the additional information B2 by an operation using the secret key KS.

When receiving the GET request, the management element 62 (receiving element 622) of the sound processing apparatus 30 uses the public key KP to verify the validity of the signature information SG in the GET request (SC32). When the signature information SG is valid, the transmitting element 624 acquires the processed data Db with a size indicated by the additional information B2 in the GET request from the main storage device 342, encodes the acquired data with the common key KC, and transmits the encoded data to the terminal apparatus 10 (SC33). The control device 12 of the terminal apparatus 10 decodes the processed data Db received from the sound processing apparatus 30 with the common key KC and supplies the decoded data to the sound emitting device 18 (SC34). The sound emitting device 18 emits a reproduced sound indicated by the processed data Db. The reproduction (SC34) of the processed data Db is sequentially performed each time the terminal apparatus 10 receives the processed data Db. That is, the processed data Db is received and transmitted and is then processed (reproduced) by the streaming method. The user can listen to the reproduced sound obtained by performing the selected sound processing on the process file F.

Figure 16:
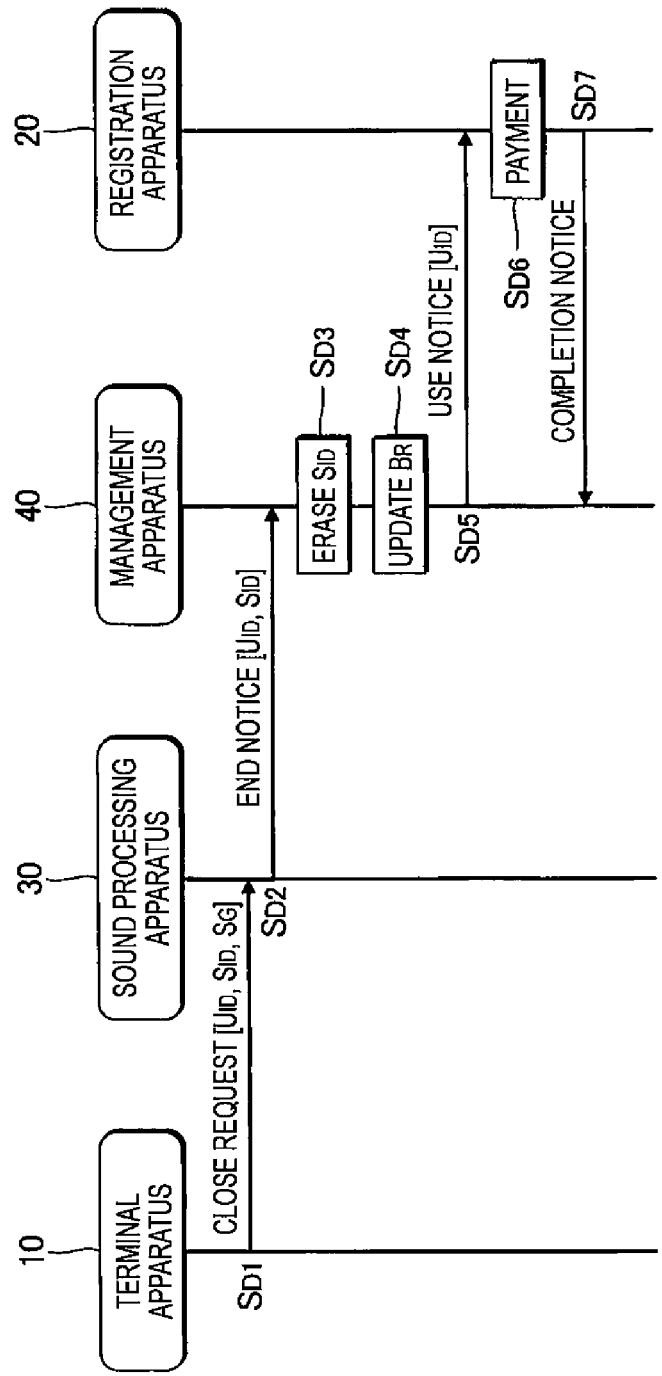
FIG. 16 is a diagram illustrating an end process.

[4] End Process SD (FIG. 16)

When the user instructs the end of sound processing or when the processing of the entire process file F is completed, an end process SD of ending the sound processing service is performed. FIG. 16 is a diagram illustrating the procedure of the end process SD. As shown in FIG. 16, the control device 12 of the terminal apparatus 10 transmits a request (CLOSE request) to complete communication to the sound processing apparatus 30 (SD1). The CLOSE request includes the user identifier UID, the session identifier SID, and the signature information SG generated by the secret key KS.

When receiving the CLOSE request, the management element 62 of the sound processing apparatus 30 verifies the validity of the signature information SG in the CLOSE request. When the signature information SG is valid, an end notice including the user identifier UID and the session identifier SID is transmitted to the management apparatus 40 (SD2). When receiving the end notice, the processing element 422 of the management apparatus 40 erases the session identifier SID designated by the end notice from the storage device 44 (SD3). That is, the communication (session) between the terminal apparatus 10 and the sound processing system 100 ends. In addition, the allocation element 424 updates the load state C2 of the sound processing apparatus 30 transmitting the end notice in the allocation information BA (SD4). For example, the allocation element 424 reduces the number of terminal apparatuses 10 (the number of terminal apparatuses 10 receiving the sound processing service) indicated by the load state C2. When the above-mentioned process is completed, the processing element 422 transmits a use notice including the user identifier UID to the registration apparatus 20 (SD5).

When receiving the use notice, the control device 22 of the registration apparatus 20 searches for the payment information PY corresponding to the user identifier UID in the use notice from the registration information BR, and performs a payment process (charge for the provision of the current sound processing service) using the payment information PY (SD6). Any known technique may be used for the payment process. The completion of the payment process is notified to the management apparatus 40 (SD7), and the end process SD is completed.

As described above, in this embodiment, the audio data Da (process target data W) is transmitted to the sound processing apparatus 30 by the streaming method and then sound processing is performed. The processed data Db subjected to the sound processing is transmitted to the terminal apparatus 10 by the streaming method and is then reproduced. Therefore, it is possible to reduce the time until the user actually listens to the reproduced sound subjected to sound processing from the start of the sound processing service, as compared to the structure in which the sound processing apparatus 30 receives the entire process file F and then starts sound processing or the structure in which the terminal apparatus 10 receives the entire file subjected to sound processing and then starts to reproduce the received file.

As described above, since the sound processing of the process target data W or the reproduction of the processed data Db is performed in real time, it is possible to change the process variable X of sound processing at any time in parallel to the proxy process SC. Therefore, the user can adjust the process variable X such that a reproduced sound with desired characteristics is generated while actually listening to the reproduced sound.

However, in the structure in which sound processing starts after the entire process file F is acquired, since a high speed is not needed to read or write the process file F, the process file F may be stored in the auxiliary storage device 344 and then read at any time when sound processing is performed. However, as in the first embodiment, in the structure in which the audio data Da or the processed data Db are processed by the streaming method, when the audio data Da or the processed data Db are stored in the auxiliary storage device 344, the reproduced sound is likely to be interrupted due to the delay of the reading or writing of data from or to the auxiliary storage device 344. The first embodiment has an advantage in that, since the audio data Da or the processed data Db are directly stored in the main storage device 342 capable of reading or writing data at a high speed, it is possible to sufficiently prevent a process delay (therefore, interruption of the reproduced sound is less likely to occur). As described above, the structure in which the audio data Da or the processed data Db received and transmitted by the streaming method is stored in the main storage device 342 is effectively achieved by making the management program PA and the sound processing program PB resident in the main storage device 342.

The load state C2 of each sound processing apparatus 30 is managed by the management apparatus 40 (allocation element 424) and the sound processing apparatus 30 that can perform sound processing among a plurality of sound processing apparatuses 30 is selectively allocated as a sound processing service provider to the terminal apparatus 10. Therefore, for example, it is possible to provide the sound processing service to a plurality of terminal apparatuses 10 in parallel while uniformizing the load of each sound processing apparatus 30.

B: Second Embodiment

Next, a second embodiment of the invention will be described. In the first embodiment, the sound effect is given as the sound processing performed by the sound processing element 64 of the sound processing apparatus 30. In the second embodiment, the sound processing element 64 performs a process (pitch correction) of changing the pitch of the sound indicated by the process target data W, in addition to giving the sound effect. In the following examples, components having the same operations and functions as those in the first embodiment are denoted by the same reference numerals as described above and a detailed description thereof will be appropriately omitted.

Figure 17:
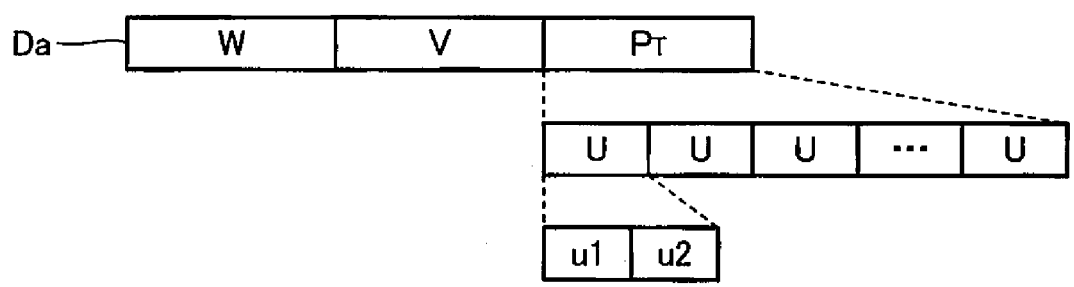
FIG. 17 is a diagram schematically illustrating audio data according to a second embodiment.

FIG. 17 is a diagram schematically illustrating audio data Da transmitted from a terminal apparatus 10 to a sound processing apparatus 30 in the second embodiment. As shown in FIG. 17, the audio data Da includes pitch indication data PT in addition to the same process target data W (waveform data) and variable setting data V as those in the first embodiment. The pitch indication data PT are data (for example, time-series data based on a MIDI standard) that sequentially designate the pitch and includes a plurality of unit data U arranged in time series. Each unit data U includes pitch data u1 (event data) that designates the pitch and timing data u2 that designates the change time of the pitch. The timing data u2 designates the time (for example, the time from the head of the process target data W) when the sound indicated by the process target data W is changed to the pitch of the pitch data u1.

The management element 62 (receiving element 622) of a sound processing apparatus 30 sequentially receives a PUT request including the audio data Da having the structure shown in FIG. 17 from the terminal apparatus 10 and stores the received PUT request in the main storage device 342. The sound processing element 64 changes the pitch of the sound indicated by the process target data W of the audio data Da stored in the main storage device 342 to a pitch indicated by the pitch data u1 of unit data U at the time indicated by timing data u2 of each unit data U of the pitch indication data PT. In addition, the sound processing element 64 adds a sound effect corresponding to variable setting data V to the process target data W after the pitch is changed by the same method as that in the first embodiment. The processed data Db generated by the above-mentioned process is sequentially stored in the main storage device 342 and is transmitted from the transmitting element 624 in response to a GET request from the terminal apparatus 10. Therefore, a sound obtained by changing the pitch of the sound indicated by the process target data W according to the pitch indication data PT is output from the sound emitting device 18 of the terminal apparatus 10.

C: Third Embodiment

Next, a third embodiment of the invention will be described. In the third embodiment, it is possible to try out the sound processing service. Specifically, the user can register the user identifier UID and the password PWD in the registration information BR (the registration of the payment information PY is not necessary) to tryout the sound processing service. When additionally registering the payment information PY in the registration information BR, the user can regularly use the sound processing service. The ticket information TCK is issued on the condition of registration of the payment information PY. Therefore, the ticket information TCK is not issued in the trial stage. That is, Steps SA11 to SA15 are omitted in the preparing process SA shown in FIG. 11.

In the trial stage, there are predetermined limitations (hereinafter, referred to as "trial limitations") in the provision of the sound processing service. The trial limitations may include, for example, a limitation in the time when the sound processing service is provided (for example, within five minutes after the OPEN request is transmitted) and a limitation in the total amount of process target data W subjected to sound processing (for example, the amount of process target data W corresponding to a 30-second reproduced sound).

Figure 18:
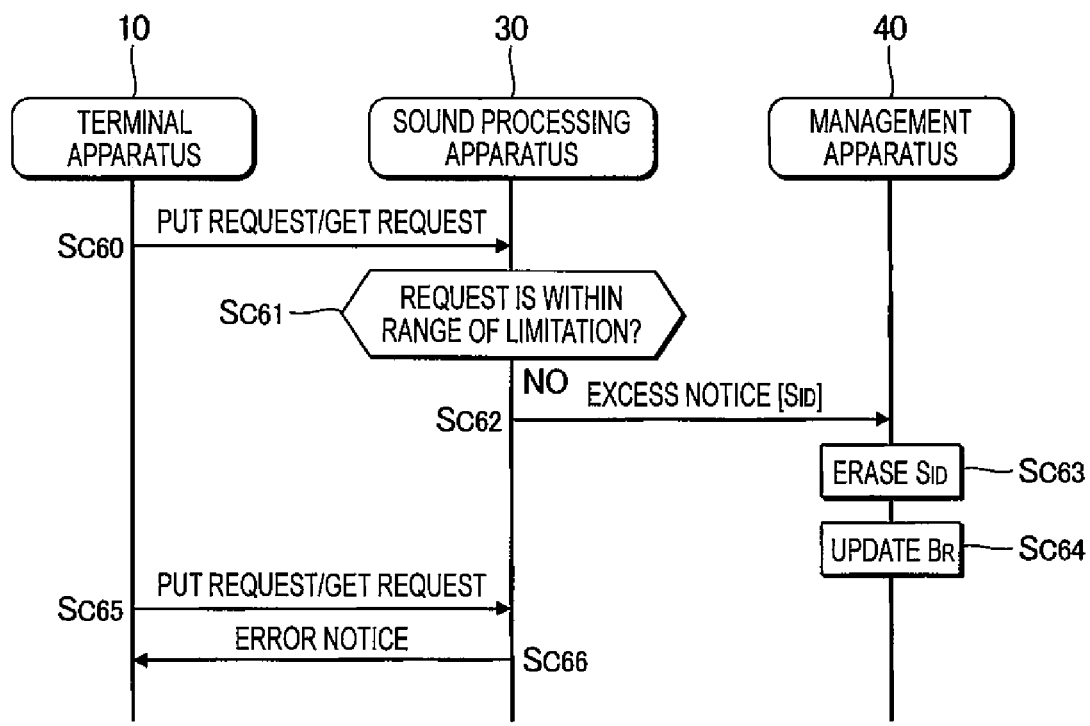
FIG. 18 is a diagram illustrating a proxy process according to a third embodiment.

In the first embodiment, when the OPEN request received from the terminal apparatus 10 does not include the ticket information TCK, the processing element 422 of the management apparatus 40 rejects the OPEN request. However, in the third embodiment, the sound processing service may be provided for trial use (free) or regular use (charged) on the basis of whether the ticket information TCK is included in the OPEN request. That is, when the OPEN request transmitted from the terminal apparatus 10 includes the ticket information TCK, the same process (FIG. 12) as that in the first embodiment is performed for regular use of the sound processing service. When the OPEN request is not included in the ticket information TCK, the proxy process SC shown in FIG. 18 is performed for trial use of the sound processing service.

Whenever receiving the PUT request or the GET request from the terminal apparatus 10 (SC60), the management element 62 of the sound processing apparatus 30 determines whether the current request is in the range of the trial limitations (SC61). When the determination result is "Yes", the management element 62 receives and processes the audio data Da and transmits the processed data Db by the same process as that in the first embodiment (not shown). On the other hand, when the determination result is "No" (when the current request is beyond the range of the trial limitations), the management element 62 performs the following process (SC62 to SC66) in order to forcibly end communication with the terminal apparatus 10.

The management element 62 of the sound processing apparatus 30 discards the current request and transmits an excess notice including the session identifier SID to the management apparatus 40 (SC62). The processing element 422 of the management apparatus 40 erases the session identifier SID designated by the excess notice from the storage device 44 (SC63). In addition, the allocation element 424 updates the load state C2 of the sound processing apparatus 30 transmitting the excess notice in the allocation information BA (SC64). For example, the allocation element 424 reduces the number of terminal apparatuses 10 (the number of terminal apparatuses 10 receiving the sound processing service) indicated by the load state C2. When the terminal apparatus 10 transmits the PUT request or the GET request to the sound processing apparatus 30 regardless of the above-mentioned process (SC65), the management element 62 of the sound processing apparatus 30 transmits an error notice indicating the current request has exceeded the trial limitations to the terminal apparatus 10 (SC66).

According to the above-described embodiment, the user can try out the sound processing service and determine whether to continue to use the sound processing service. In the above-described embodiment, limitations in the trial stage are given as an example. However, communication between the terminal apparatus 10 and the sound processing apparatus 30 may be limited in regular use, as shown in FIG. 18.

D: Fourth Embodiment

In each of the above-described embodiments, the sound processing apparatus 30 performs sound processing as a proxy. In a fourth embodiment, the operation mode (hereinafter, referred to as a "proxy mode") in which the sound processing apparatus 30 performs sound processing as a proxy and the operation mode (hereinafter, referred to as a "self-processing mode") in which the terminal apparatus 10 performs sound processing are selected.

Figure 19:
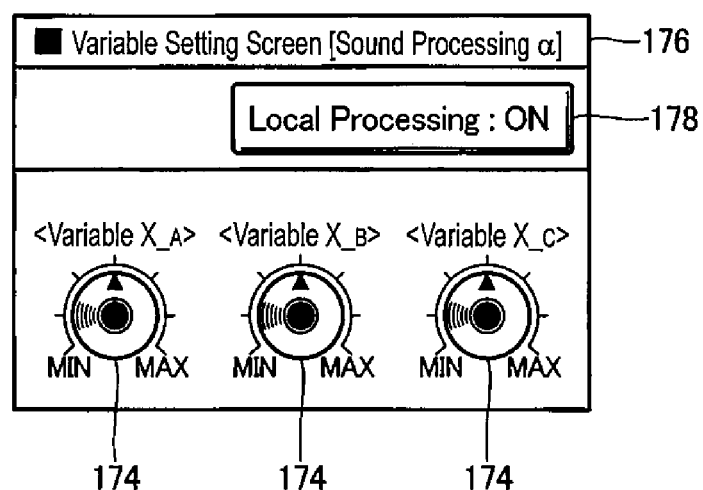
FIG. 19 is a diagram schematically illustrating a variable setting screen according to a fourth embodiment.

FIG. 19 is a diagram schematically illustrating a variable setting screen 176 displayed on the display device 17 of the terminal apparatus 10 after the preparing process SA (FIG. 11) and the start process SB (FIG. 12) are performed. As shown in FIG. 19, the variable setting screen 176 includes an operator 178 indicating the operation mode (the proxy mode/ the self-processing mode) of the sound processing system 100 (sound processing apparatus 30) in addition to the components of the variable setting screen 172 (FIG. 13) according to the first embodiment. Whenever the user uses the input device 16 to operate the operator 178, the operation mode of the sound processing system 100 is changed from one of the proxy mode and the self-processing mode (in FIG. 19, "Local Processing") to the other mode.

Figure 20:
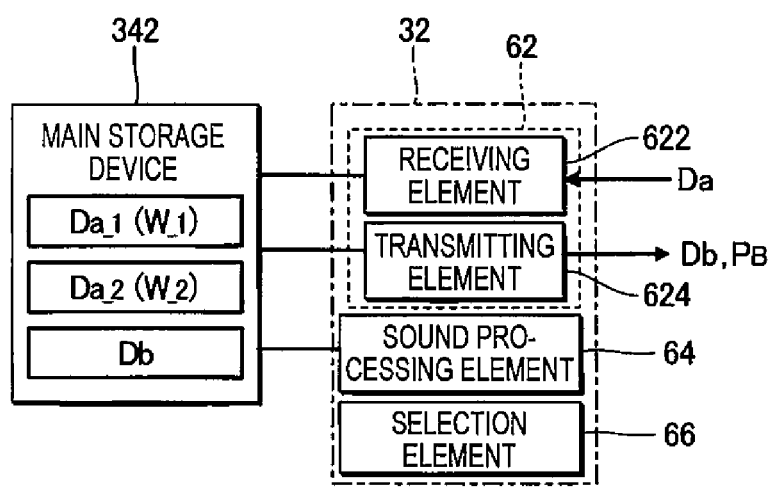
FIG. 20 is a block diagram illustrating a sound processing apparatus according to a fourth embodiment.

FIG. 20 is a block diagram illustrating a sound processing apparatus 30 according to the fourth embodiment. As shown in FIG. 20, a control device 32 of the sound processing apparatus 30 according to the fourth embodiment functions as a selection element 66 in addition to the management element 62 and the sound processing element 64. The selection element 66 variably sets the operation mode to one of the proxy mode and the self-processing mode.

Figure 21:
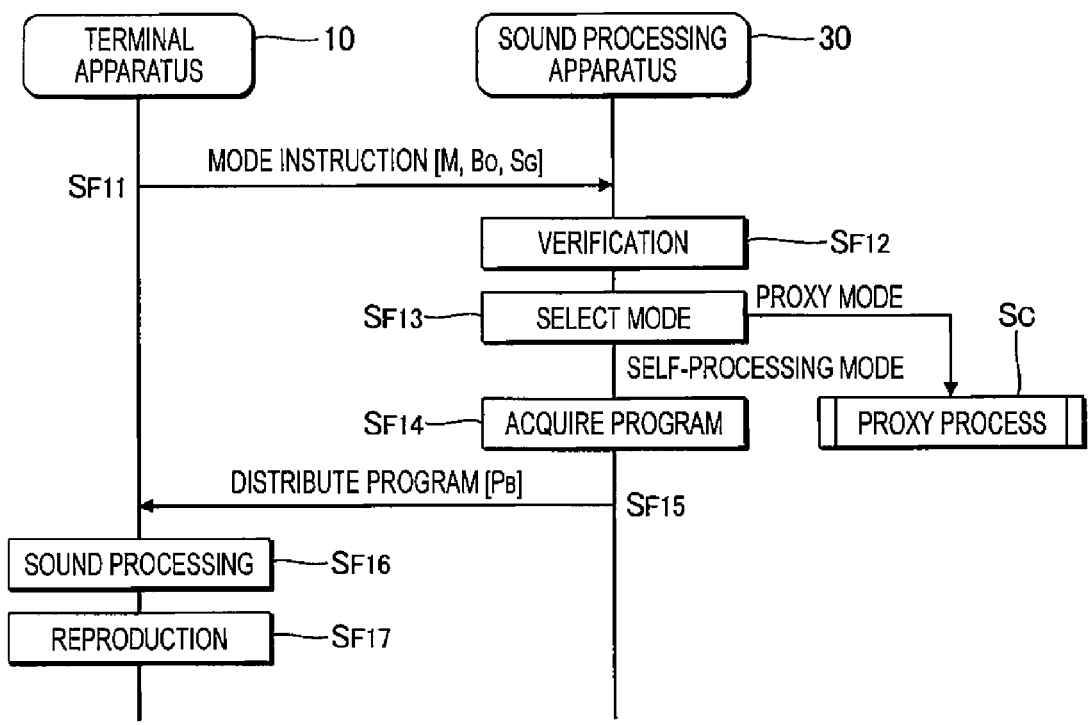
FIG. 21 is a diagram illustrating an operation related to the change of the operation mode according to the fourth embodiment.

FIG. 21 is a diagram illustrating an operation related to the setting of the operation mode. Whenever the user operates the operator 178, the control device 12 of the terminal apparatus 10 transmits a mode instruction to the sound processing apparatus 30 allocated thereto by the start process SB (SB9) of the management apparatus 40 (SF11). The mode instruction includes mode information M indicating the operation mode selected by the operation of the operator 178 by the user, additional information B0 including the user identifier UID and the session identifier SID similar to the additional information B1, and signature information SG generated from the mode information M and the additional information B0 using the secret key KS.

When receiving the mode instruction from the terminal apparatus 10, the management element 62 of the sound processing apparatus 30 verifies the validity of the signature information SG in the mode instruction, similar to Step SC13 in FIG. 14 (SF12). When it is determined that the signature information SG is invalid, the management element 62 notifies the user of the terminal apparatus 10 that a change in the operation mode has been rejected and ends the process (not shown). On the other hand, when the signature information SG is valid, the selection element 66 sets the operation mode of the sound processing apparatus 30 to the operation mode (the proxy mode/the self-processing mode) indicated by the mode information M in the mode instruction (SF13)

When the selection element 66 selects the proxy mode, the same proxy process SC as that shown in FIG. 14 is performed. That is, the transmitting process SC1 in which the receiving element 622 receives the audio data Da from the terminal apparatus 10, the processing operation SC2 in which the sound processing element 64 performs sound processing on the audio data Da to generate the processed data Db, and the receiving process SC3 in which the transmitting element 624 transmits the processed data Db to the terminal apparatus 10 are sequentially performed. Similar to the first embodiment, the set value vA set by the user to operate the operator 174 of the variable setting screen 176 shown in FIG. 19 is applied to the sound processing performed by the sound processing element 64. In the proxy mode, the process load of the terminal apparatus 10 is less than that in the self-processing mode.

When the selection element 66 selects the self-processing mode, a process of allowing the terminal apparatus 10 to perform sound processing is performed. That is, first, the management element 62 of the sound processing apparatus 30 acquires a sound processing program PB corresponding to the sound processing selected by the user in the preparing process SA (SA10) from the auxiliary storage device 344 (or the main storage device 342) (SF14). Then, the management element 62 (transmitting element 624) encodes the sound processing program PB acquired in Step SF14 with the common key KC and transmits the sound processing program PB to the terminal apparatus 10 (SF15). The terminal apparatus 10, which is the destination of the sound processing program PB, is specified by the additional information B0 in the mode instruction received from the terminal apparatus 10 in Step SF11.

The control device 12 of the terminal apparatus 10 decodes the sound processing program PB received from the sound processing apparatus 30 with the common key KC, stores the sound processing program PB in the storage device 14, and executes the sound processing program PB (SF16). That is, the control device 12 performs the same sound processing (Step SC21 in FIG. 14) as that performed by the sound processing element 64 of the sound processing apparatus 30 on the process file F (process target data W) stored in the storage device 14 and supplies the processed process target data W (the processed data Db) to the sound emitting device 18 (SF17). Similar to the proxy mode, the set value vA set by the user to operate the operator 174 of the variable setting screen 176 shown in FIG. 19 is applied to the sound processing performed by the control device 12. The sound emitting device 18 reproduces the process target data W generated by the control device 12 as a sound wave. As described above, since the terminal apparatus 10 performs sound processing in the self-processing mode (that is, the transmission of the audio data Da or the processed data Db between the terminal apparatus 10 and the sound processing apparatus 30 is not needed), it is possible to reduce the delay of the reproduction of the processed data Db, as compared to the proxy mode.

In the fourth embodiment, the operation mode of the sound processing apparatus 30 is set to one of the proxy mode in which the sound processing apparatus 30 performs sound processing as a proxy and the self-processing mode in which the sound processing program PB is distributed to allow the terminal apparatus 10 to perform sound processing. Therefore, it is possible to selectively give priority to one of the proxy mode capable of reducing the process load of the terminal apparatus and the self-processing mode capable of reducing a reproduction delay according to the user's intent.

Since the variable setting screen 176 operated by the user is common to the proxy mode and the self-processing mode, it is possible to change the operation mode of the sound processing apparatus 30 without the user being aware of the object (sound processing apparatus 30/terminal apparatus 10) that performs sound processing. In addition, it is possible to reduce the time and effort required to create (develop), for example, the variable setting screen 176, as compared to the structure in which different variable setting screens 176 are provided in the proxy mode and the self-processing mode.

E: Fifth Embodiment

In the fourth embodiment, the sound processing apparatus selects the operation mode (the proxy mode/the self-processing mode), performs sound processing as a proxy, and distributes the sound processing program PB. However, in a fifth embodiment, individual apparatuses in a sound processing system 100 perform the above-mentioned operations.

Figure 22:
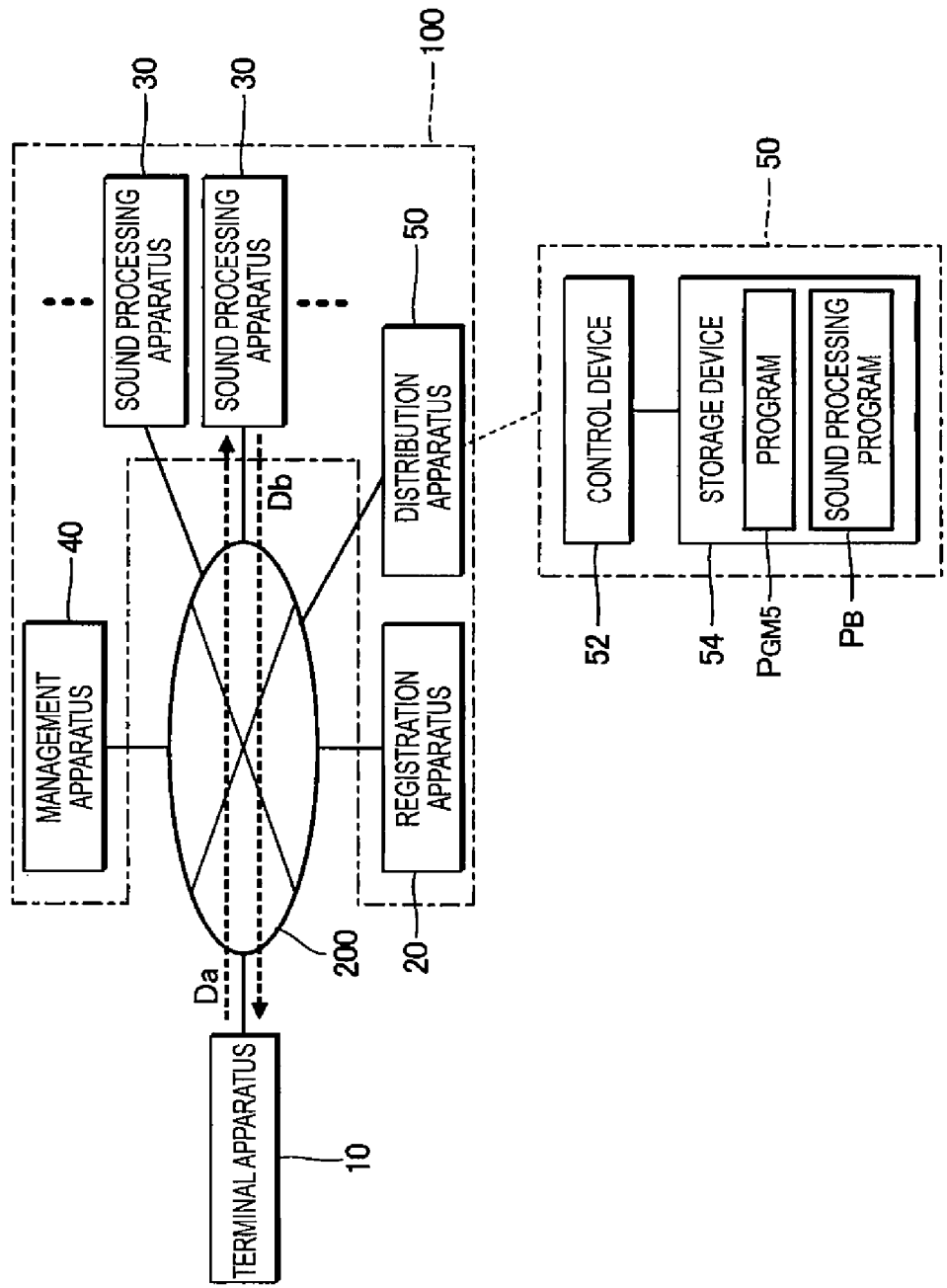
FIG. 22 is a block diagram illustrating a sound processing system according to a fifth embodiment.

FIG. 22 is a block diagram illustrating the sound processing system 100 according to the fifth embodiment. As shown in FIG. 22, the sound processing system 100 according to the fifth embodiment includes a distribution apparatus 50 that distributes the sound processing program PB to the terminal apparatus 10 in addition to the components according to the first embodiment. As shown in FIG. 22, the distribution apparatus 50 is implemented by a computer system including a control device 52 and a storage device 54. The storage device 54 stores a program PGM5 executed by the control device 52 and the sound processing program PB that allows the terminal apparatus 10 to perform sound processing. The control device 52 executes the program PGM5 stored in the storage device 54 to distribute the sound processing program PB to the terminal apparatus 10.

Figure 23:
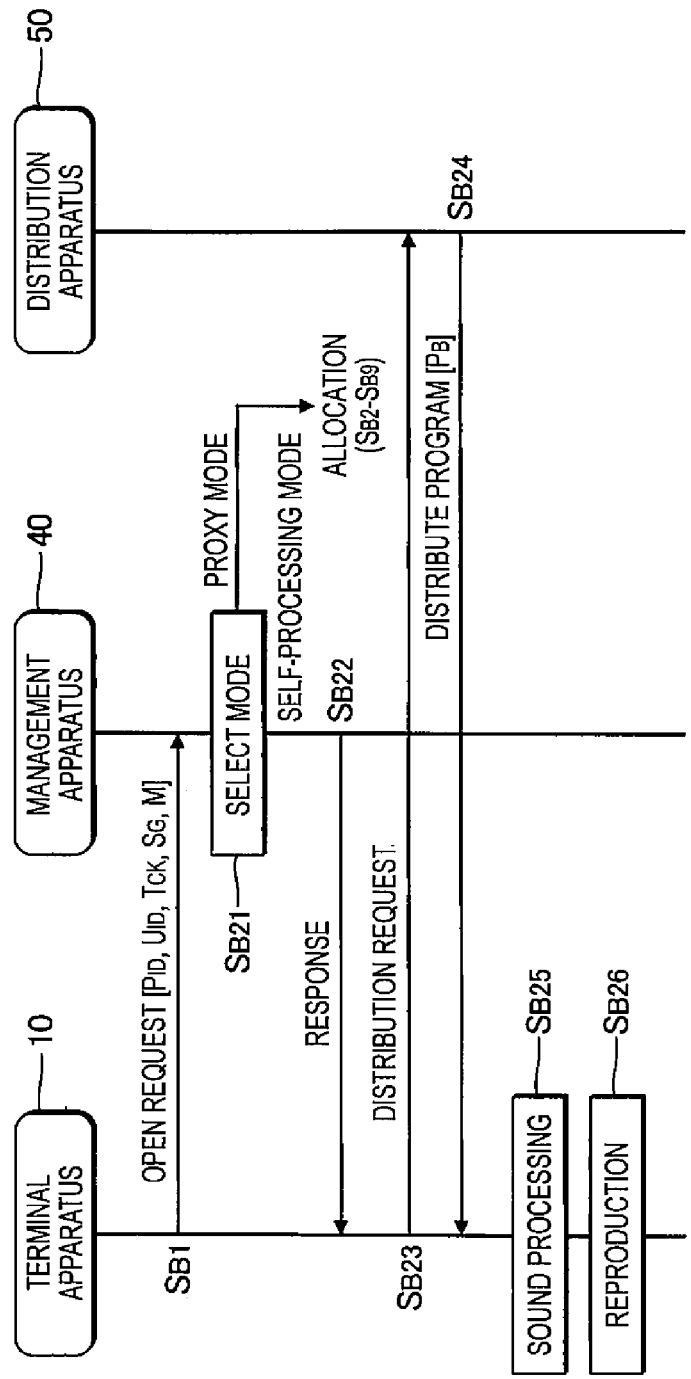
FIG. 23 is a diagram illustrating an operation related to the change of the operation mode according to the fifth embodiment.

FIG. 23 is a diagram illustrating the procedure of a start process SB (a modification of the start process shown in FIG. 12) according to the fifth embodiment. As shown in FIG. 23, an OPEN request (SB1) transmitted from the terminal apparatus 10 to the management apparatus 40 includes mode information M in addition to the same information (PID, UID, TCK, and SG) as that in the first embodiment. The mode information M designates one of the proxy mode and the self-processing mode according to instructions input to the variable setting screen 176 (FIG. 19) by the user, similar to the fourth embodiment.

When receiving the OPEN request from the terminal apparatus 10, the processing element 422 of the management apparatus 40 selects one of the proxy mode and the self-processing mode according to the mode information M in the OPEN request (SB21). When the processing element 422 selects the proxy mode, the sound processing apparatus 30 is allocated to the terminal apparatus 10 (SB2 to SB9) and then the proxy process SC shown in FIG. 14 is performed, similar to the first embodiment.

On the other hand, when the self-processing mode is selected, the processing element 422 transmits a response to the OPEN request to the terminal apparatus 10 (SB22). When receiving the response from the management apparatus 40, the control device 12 of the terminal apparatus 10 transmits a request (distribution request) for a sound processing program PB for implementing sound processing (purchased sound processing) that can be used by the user to the distribution apparatus 50 (SB23). The distribution apparatus 50, which is the destination of the distribution request, or the location of the sound processing program PB is specified by, for example, location information (for example, a URL (Uniform Resource Locator)) of which notification is given by the management apparatus 40 in advance. The location information is included in, for example, the start response (the response to the INITIATE request) that is transmitted from the management apparatus 40 to the terminal apparatus 10 in Step SA9 of FIG. 11 or the response that is transmitted from management apparatus 40 to the terminal apparatus 10 in Step SB22 of FIG. 23.

When receiving the distribution request, the control device 52 of the distribution apparatus 50 acquires the sound processing program PB designated by the location information in the distribution request from the storage device 54 and transmits the acquired sound processing program PB to the terminal apparatus 10 (SB24). The control device 12 of the terminal apparatus 10 stores the sound processing program PB received from the distribution apparatus 50 in the storage device 14, executes the sound processing program PB (SB25), and supplies the process target data W (processed data Db) subjected to the sound processing to the sound emitting device 18 (SB26), similar to Steps SF16 and SF17 in FIG. 21. An operation of applying the set value vA indicated by the variable setting screen 176 to sound processing performed by the terminal apparatus 10 is the same as that in the fourth embodiment. In the fifth embodiment, the same effect as that in the fourth embodiment is obtained.

F: Modifications

The above-described embodiments may be changed in various ways. Detailed modifications are exemplified below. Two or more modifications arbitrarily selected from the following modifications may be combined with each other.

(1) Modification 1

The content of sound processing is not limited to the giving of the sound effect in the first embodiment or the correction of the pitch in the second embodiment. For example, the sound processing apparatus 30 may perform sound processing to generate a performance sound or a singing sound of the music. For example, when the management element 62 of the sound processing apparatus 30 receives audio data Da that designate the pitch and emission time of each musical sound of the music in time series from the terminal apparatus 10, the sound processing element 64 generates the processed data Db indicating the performance sounds of the musical sounds that are designated in time series by the audio data Da. That is, the sound processing apparatus 30 executes, for example, a MIDI sequencer and software for synthesizing musical sounds as the sound processing program PB to perform the synthesis of musical sounds (automatic performance) as sound processing.

When the management element 62 of the sound processing apparatus 30 receives the audio data Da that designate the pitch and words (syllables) of a singing sound in time series from the terminal apparatus 10, the sound processing element 64 adjusts a phoneme corresponding to the words designated by the audio data Da to the pitch indicated by the audio data Da and connects them, thereby generating the processed data Db indicating a singing sound. That is, the sound processing apparatus 30 executes a singing synthesis program as the sound processing program PB to perform singing synthesis (voice synthesis) as sound processing.

As can be seen from the above-mentioned examples, the sound processing according to the invention is included in a process related to a sound, and the detailed content thereof does not matter. The giving of the sound effect in the first embodiment, the correction of the pitch in the second embodiment, and the synthesis of musical sounds or the synthesis of singing sounds in Modification 1 are typical examples included in the content of sound processing. In addition, the format or content of the audio data Da or the processed data Db is appropriately selected according to the kind or content of sound processing and any format of data may be used in the invention. For example, as can be seen from the above-mentioned example, when the giving of the sound effect in the first embodiment and the correction of the pitch in the second embodiment are performed as sound processing, the audio data Da including waveform data as the process target data W is appropriately used. When the synthesis of performance sounds or singing sounds is performed as sound processing as in Modification 1, time-series data indicating a synthesized sound is appropriately used as the audio data Da. A musical component is not indispensable for audio data Da. For example, the waveform data of various kinds of sounds (for example, a wave sound, a wind sound, or an engine sound), such as natural sounds or artificial sounds that are not directly related to the music, may be included as the process target data W in the audio data Da and then sound processing may be performed.

(2) Modification 2

In each of the above-described embodiments, two audio data Da (Da_1 and Da_2) are stored in the main storage device 342 of the sound processing apparatus 30. However, the number of audio data Da stored in the main storage device 342 may be arbitrarily changed. Therefore, the number of other audio data Da applied to the sound processing of the audio data Da is also appropriately changed. For example, when the previous and next audio data Da are not affected by sound processing performed on each audio data Da, the structure in which other audio data Da are used in the sound processing of the audio data Da may be omitted.

(3) Modification 3

In each of the above-described embodiments, the process file F (audio data Da) that has been previously created and then stored in the storage device 14 is transmitted from the terminal apparatus 10 to the sound processing apparatus 30 by the streaming method. However, the terminal apparatus 10 may dynamically generate the audio data Da in parallel to the process of sequentially transmitting the audio data Da to the sound processing apparatus 30. That is, the terminal apparatus 10 (control device 12) sequentially transmits the audio data Da that is supplied from an input device of, for example, an electronic musical instrument to the terminal apparatus 10 by the operation (playing) of the user to the sound processing apparatus 30 by the streaming method (that is, without storing the audio data Da as a static process file F in the storage device 14).

(4) Modification 4

In each of the above-described embodiments, the variable setting data V designate the process variable X. However, information indicating whether sound processing (in particular, the giving of the sound effect or the correction of the pitch) is performed (on/off) may be included in the variable setting data V. When the execution of sound processing is indicated by the variable setting data V, the sound processing element 64 of the sound processing apparatus 30 performs sound processing. When the stopping of sound processing is indicated by the variable setting data V, the sound processing element stops the sound processing. According to the above-mentioned structure, it is possible to start/stop the sound processing selected by the user while the sound processing is being performed by the streaming method (during the proxy process SC).

(5) Modification 5

In the fourth embodiment and the fifth embodiment, the operation mode (the proxy mode/the self-processing mode) is changed in response to instructions from the user (the operation of the operator 178). However, the trigger or standard for the selection of the operation mode is appropriately changed as follows.

For example, when the transmission capability of the communication network 200 is low (for example, the transmission rate is low or when there is heavy communication traffic), the self-processing mode in which the transmission or reception of the audio data Da or the processed data Db are not needed is preferable. Therefore, the following structure is preferable: when the transmission capability of the communication network 200 is high, the proxy mode is selected; and when the transmission capability of the communication network 200 is low, the self-processing mode is selected.

When the size (the total amount of data) of the process file F, which is a sound processing target, is greater than that of the sound processing program PB, the self-processing mode is preferable in order to reduce the communication traffic of the communication network 200. Therefore, the following structure is preferable: when the size of the process file F is smaller than a predetermined threshold value (for example, the size of the sound processing program PB), the proxy mode is selected; and when the size of the process file F is greater than the threshold value, the self-processing mode is selected.

(6) Modification 6

In the fourth embodiment and the fifth embodiment, the sound processing program PB common to the proxy mode and the self-processing mode is used. However, the content of the sound processing program PB (PB1) executed by the sound processing apparatus 30 in the proxy mode may be different from that of the sound processing program PB (PB2) executed by the terminal apparatus 10 in the self-processing mode, which will be described below.

For example, the sound processing program PB2 obtained by simplifying the sound processing program PB1 in the proxy mode (for example, by omitting a specific function) may be used in the self-processing mode. When the processing capability of the terminal apparatus 10 is low (for example, when the terminal apparatus 10 is a portable information terminal), the above-mentioned structure is preferable.

Contrary to the above-mentioned example, the sound processing program PB1 obtained by simplifying the sound processing program PB2 in the self-processing mode may be used in the proxy mode. For example, in the trial stage of the sound processing service in the third embodiment, the following structure is preferable: when the proxy mode is selected, a brief version of the sound processing program PB1 is executed by the sound processing apparatus 30, and the user completes a process for regular use of the sound processing service (or purchasing the sound processing program PB), the self-processing mode is selected and the sound processing program PB2 (the program capable of generating a higher-quality reproduced sound than the sound processing program PB1) is distributed to the terminal apparatus 10. In the above-mentioned structure, an operator for settling the regular use of the sound processing service or the purchase of the sound processing program PB may be added to the variable setting screen 176 shown in FIG. 19.

(7) Modification 7

In the fourth embodiment and the fifth embodiment, one of the sound processing (proxy mode) by the sound processing apparatus 30 and the sound processing (self-processing mode) by the terminal apparatus 10 is selected. However, the sound processing apparatus 30 and the terminal apparatus 10 may share the sound processing. For example, the sound processing apparatus 30 may perform some of a plurality of processes forming one kind of sound processing and the terminal apparatus 10 may perform the other processes. Alternatively, the sound processing apparatus 30 may perform some of plural kinds of sound processing selected by the user and the terminal apparatus 10 may perform the other kinds of sound processing.

(8) Modification B

The relationship between each function provided by the sound processing system 100 and a single unit/separate unit of each of the apparatuses forming the sound processing system 100 is appropriately changed. For example, the registration apparatus 20 or the sound processing apparatus 30 and the management apparatus 40 may be integrated into one apparatus, or the processing element 422 and the allocation element 424 of the management apparatus 40 may be provided as a separate apparatus.

The sound processing according to the invention means various kinds of processes related to sounds and a typical example of the sound processing is the modulation or generation of sounds. The modulation of sounds includes, for example, a process of adding a reverberant sound or delay (echo) to the sound indicated by audio data and a process of changing the pitch or frequency characteristics of the sound indicated by audio data. The generation of sounds includes, for example, a process of generating a musical sound from audio data that indicates musical notes in time series (sequencer) and a process of synthesizing singing sounds from audio data that indicates the words or a pitch in time series.

In the technique disclosed in Patent Document 1 or Patent Document 2, since the process variable applied to sound processing is fixed to a predetermined value, the sound subjected to sound processing is less likely to have the characteristics desired by the user. However, a sound processing system according to a second aspect of the invention includes a management apparatus and a sound processing apparatus that communicate with a terminal apparatus through a communication network. The management apparatus includes a processing element that transmits variable information related to the process variable of sound processing to the terminal apparatus. The sound processing apparatus includes: a receiving element that receives audio data, which includes process target data to be subjected to sound processing and variable setting data indicating a set value of the process variable set by the terminal apparatus according to variable information, from the terminal apparatus; a sound processing element that performs sound processing corresponding to the set value indicated by the variable setting data on the process target data to generate processed data; and a transmitting element that transmits the processed data generated by the sound processing element to the terminal apparatus. In the above-mentioned aspect, the process variable of the sound processing performed by the sound processing element is set to be variable in the terminal apparatus. Therefore, it is possible to generate a sound with the characteristics desired by the user using sound processing. In addition, the variable information related to the process variable of sound processing is transmitted to the terminal apparatus and is then used to set the set value of the process variable. Therefore, it is possible to appropriately set the set value of the process variable in the terminal apparatus.

In a second aspect of the invention, the management apparatus selectively transmits the variable information of each kind of sound processing that can be used by the user of the terminal apparatus among plural kinds of sound processing to the terminal apparatus. In the above-mentioned aspect, since the variable information of the sound processing that can be used by the user among plural kinds of sound processing is selectively transmitted to the terminal apparatus, it is possible to reduce the load of a process of selecting the variable information in the terminal apparatus or communication traffic between the terminal apparatus and the management apparatus, as compared to the structure in which variable information on all kinds of sound processing is transmitted to the terminal apparatus.

Patent Document 1 or Patent Document 2 does not disclose a process when a plurality of terminal apparatuses requests sound processing, and the sound processing requests from the plurality of terminal apparatuses are likely to be concentrated on the sound processing apparatus. However, a sound processing system according to a third aspect of the invention includes a management apparatus and a plurality of sound processing apparatuses that communicate with a terminal apparatus through a communication network. Each of the sound processing apparatuses includes: a receiving element that receives audio data from the terminal apparatus; a sound processing element that performs sound processing on the audio data to generate processed data; and a transmitting element that transmits the processed data to the terminal apparatus. The management apparatus selects a storage element that stores the load state of each of the plurality of sound processing apparatuses and the sound processing apparatus, which is the destination of the audio data from the terminal apparatus, among the plurality of sound processing apparatuses according to the load state of each sound processing apparatus. In the above-mentioned aspect, since the sound processing apparatus, which is the destination of the audio data, is selected according to the load state of each sound processing apparatus, it is possible to appropriately allocate each sound processing apparatus to each terminal apparatus even when a plurality of terminal apparatuses requests sound processing.

In the second aspect or the third aspect, the receiving element receives the audio data that are sequentially transmitted from the terminal apparatus by the streaming method, and the transmitting element sequentially transmits the processed data to the terminal apparatus by the streaming method. In the above-mentioned aspect, audio data are transmitted to the sound processing apparatus by the streaming method and sound processing is performed on the audio data. The processed data subjected to the sound processing are transmitted to the terminal apparatus by the streaming method and are then reproduced. Therefore, it is possible to reduce the time until the user can actually listen to a reproduced sound subjected to sound processing from the transmission of the audio data from the terminal apparatus. However, in the second aspect or the third aspect, data are not necessarily received and transmitted by the streaming method. For example, the audio data transmitted from the terminal apparatus or the processed data transmitted from the sound processing apparatus may be one entire file.

Even in an environment in which the sound processing apparatus performs sound processing as a proxy, in some cases, it is preferable or necessary for the terminal apparatus to perform sound processing (local processing). For example, it is preferable that the terminal apparatus perform sound processing in the following cases: a case in which it is necessary to reliably reduce a delay when the terminal apparatus reproduces data subjected to sound processing; a case in which the transmission capability of the communication network between the sound processing apparatus and the terminal apparatus is insufficient; and a case in which the user wants to perform sound processing using the user's own terminal apparatus.

A sound processing system according to a fourth aspect of the invention includes: a selection element that selects a proxy mode and a self-processing mode; a sound processing element that performs sound processing on audio data received from a terminal apparatus to generate processed data and transmits the processed data to the terminal apparatus when the selection element selects the proxy mode; and a distribution element that distributes a sound processing program for allowing the terminal apparatus to perform the sound processing to the terminal apparatus when the selection element selects the self-processing mode. In the above-mentioned aspect, it is possible to select the self-processing mode that transmits the sound processing program to the terminal apparatus such that the terminal apparatus performs sound processing, in addition to the proxy mode in which the sound processing element performs sound processing as a proxy. Therefore, it is possible to flexibly respond to various situations, such as a situation in which sound processing by a proxy is preferable and a situation in which sound processing by the terminal apparatus is preferable.

Detailed examples of the sound processing system according to the fourth aspect will be described below as a fourth embodiment and a fifth embodiment. Each component of the sound processing system according to the fourth aspect may be implemented by separate apparatuses or a single apparatus. For example, in the following fourth embodiment, the sound processing system according to the fourth aspect includes a single sound processing apparatus including a selection element (for example, a selection element 66 shown in FIG. 20), a sound processing element (for example, a sound processing element 64 shown in FIG. 20), and a distribution element (for example, a management element 62 shown in FIG. 20). In the fifth embodiment, the sound processing system includes a selection element (for example, a management apparatus 40 (processing element 422) shown in FIG. 22), a sound processing element (for example, a sound processing apparatus 30 shown in FIG. 22), and a distribution element (for example, a distribution apparatus 50 shown in FIG. 22) as separate apparatuses.

In the sound processing system according to the fourth aspect, when the selection element selects the proxy mode, the sound processing element executes a first sound processing program to generate the processed data. When the selection element selects the self-processing mode, the distribution element transmits a second sound processing program to the terminal apparatus. For example, the following structures may be used: a structure in which the first sound processing program and the second sound processing program are a common program; and a structure in which the kind of sound processing is common to the first sound processing program and the second sound processing program, but the first sound processing program and the second sound processing program have different contents. As the structure in which the first sound processing program and the second sound processing program are different from each other, for example, the following structure may be considered: the content of one of the first sound processing program and the second sound processing program is simpler than that of the other sound processing program (for example, a specific function is omitted or the quality of sound processing is reduced).

In the sound processing system according to the fourth aspect, a standard for the selection of the operation mode by the selection element is arbitrarily set. However, for example, one of the proxy mode and the self-processing mode may be selected in response to instructions input to the terminal apparatus by the user. In addition, the following structures may be used: a structure in which one of the proxy mode and the self-processing mode is selected according to the transmission capability (transmission rate) of the communication network (for example, when the transmission capability is low, the self-processing mode is selected); and a structure in which one of the proxy mode and the self-processing mode is selected according to the total amount of audio data to be subjected to sound processing (for example, when the total amount of audio data is large, the self-processing mode is selected). In the fourth aspect, some of the characteristics of the first aspect, such as the reception and transmission of data by the streaming method and the residence of the management program and the sound processing program, may be omitted.

The invention is also specified as a program for allowing a computer to function as the sound processing apparatus or the management apparatus in each of the above-mentioned aspects. The program according to the invention is stored in a computer readable recording medium, and the computer readable recording medium is provided to the user and is then installed in the computer. Alternatively, the program is provided from a server in the form of data streams through a communication network and is then installed in the computer.

What is claimed is:

1. A sound processing apparatus that communicates with a terminal apparatus through a communication network, the sound processing apparatus comprising:
a control device configured to:
receive audio data streamed from the terminal apparatus, wherein the received audio data is in a form of a plurality of waveform data that are divided from a process file stored in the terminal apparatus;
process the received audio data to generate processed audio data; and
stream the processed audio data to the terminal apparatus,
wherein the audio data includes first audio data, second audio data, and third audio data,
wherein the control device is configured to process the first audio data using the second audio data,
wherein the control device is configured to receive the third audio data before receiving the first audio data and the second audio data from the terminal apparatus, and store the third audio data in a main storage device, and
wherein in case where the third audio data is stored in the main storage device when the control device receives the first audio data and the second audio data from the terminal apparatus, the control device is configured to erase the third audio data from the main storage device.

2. The sound processing apparatus according to claim 1, wherein:
the audio data includes process target data to be processed by the control device and variable setting data indicating a set value, which is designated by the terminal apparatus and is a process variable of the process target to be processed by the control device, and
the control device is configured to process the process target data using the set value indicated by the variable setting data.

3. The sound processing apparatus according to claim 2, wherein:
the variable setting data includes timing data designating a time when a value of the process variable is changed to the set value, and
the control device is configured to change the value of the process variable to the set value at the time designated by the timing data.

4. The sound processing apparatus according to claim 1, wherein the control device is configured to update allocation information including at least a load status of a plurality of sound processing apparatuses on the communication network.

5. The sound processing apparatus according to claim 4, wherein the allocation information further includes an identifier, and a startup state.

6. A method of communicating a sound processing apparatus with a terminal apparatus through a communication network, the sound processing apparatus having a control device that executes the method comprising:
a receiving step of receiving audio data streamed from the terminal apparatus, wherein the received audio data is in a form of a plurality of waveform data that are divided from a process file stored in the terminal apparatus;
a processing step of processing the received audio data to generate processed audio data;
a streaming step of streaming the processed audio data to the terminal apparatus,
wherein the audio data includes first audio data, second audio data, and third audio data,
wherein the processing step processes the first audio data using the second audio data,
wherein the receiving step receives the third audio data before receiving the first audio data and the second audio data from the terminal apparatus, and stores the third audio data in a main storage device; and
an erasing step of, in case where the third audio data is stored in the main storage device when the control device receives the first audio data and the second audio data from the terminal apparatus, erasing the third audio data from the main storage device.

* * * * *